US012613855B2

(12) United States Patent
    Khalyknazarov et al.

(10) Patent No.:    US 12,613,855 B2
(45) Date of Patent:    Apr. 28, 2026

(54) DATABASE SYSTEMS AND METHODS FOR CLIENT-SIDE INITIATION OF SERVER-SIDE ACTIONS

(71) Applicant: Salesforce, Inc., San Francisco, CA (US)

(72) Inventors: Eldor Khalyknazarov, Allen, TX (US); Puneet Dhaliwal, Dublin, CA (US); Dai Duong Doan, Alameda, CA (US)

(73) Assignee: Salesforce, Inc.

( * ) Notice: Subject to any disclaimer, the term of this patent is extended or adjusted under 35 U.S.C. 154(b) by 0 days.

(21) Appl. No.: 18/812,981

(22) Filed: Aug. 22, 2024

(65) Prior Publication Data

US 2024/0411743 A1     Dec. 12, 2024

Related U.S. Application Data

(63) Continuation of application No. 17/822,509, filed on Aug. 26, 2022, now Pat. No. 12,099,491.

(51) Int. Cl.
    *G06F 16/23*         (2019.01)
(52) U.S. Cl.
    CPC ................................... *G06F 16/23* (2019.01)
(58) Field of Classification Search
    CPC ... G06F 16/23; G06F 16/2358; G06F 16/2379
    See application file for complete search history.

(56) References Cited

U.S. PATENT DOCUMENTS 5,577,188 A    11/1996   Zhu
5,608,872 A    3/1997    Schwartz et al.

5,649,104 A    7/1997    Carleton et al.
5,715,450 A    2/1998    Ambrose et al.
5,761,419 A    6/1998    Schwartz et al.
5,819,038 A    10/1998   Carleton et al.
5,821,937 A    10/1998   Tonelli et al.
            (Continued)

OTHER PUBLICATIONS

J. Zhou, H. V. Leong, Q. Lu and K. C. K. Lee, "Optimizing Update Threshold for Distance-based Location Tracking Strategies in Moving Object Environments," 2007 IEEE International Symposium on a World of Wireless, Mobile and Multimedia Networks, Espoo, Finland, 2007, pp. 1-8. (Year: 2007).*

*Primary Examiner* — Cheyne D Ly
(74) *Attorney, Agent, or Firm* — Ingrassia Fisher & Lorenz, LLP

(57)                ABSTRACT

Database systems and methods are provided for initiating an action at a database system by an instance of a native application at a client device coupled to the database system over a network. One method involves a service associated with a field service application at a client device monitoring a location of the client device to determine the location satisfies update criteria including a field of a data record associated with a service appointment when the location is within a threshold distance of a value for the field of the data record corresponding to an address for the service appointment. The service automatically provides an indication to automatically update a status field of the data record associated with the service appointment at the database system in accordance with a configuration associated with the instance of the field service application when the location of the client device satisfies the update criteria.

20 Claims, 21 Drawing Sheets

(56)                  References Cited

U.S. PATENT DOCUMENTS

| | | | |
|---|---|---|---|
| 5,831,610 | A | 11/1998 | Tonelli et al. |
| 5,873,096 | A | 2/1999 | Lim et al. |
| 5,913,214 | A | 6/1999 | Madnick et al. |
| 5,918,159 | A | 6/1999 | Fomukong et al. |
| 5,963,953 | A | 10/1999 | Cram et al. |
| 6,092,083 | A | 7/2000 | Brodersen et al. |
| 6,161,149 | A | 12/2000 | Achacoso et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,135 | B1 | 4/2001 | Brodersen et al. |
| 6,233,617 | B1 | 5/2001 | Rothwein et al. |
| 6,266,669 | B1 | 7/2001 | Brodersen et al. |
| 6,295,530 | B1 | 9/2001 | Ritchie et al. |
| 6,324,568 | B1 | 11/2001 | Diec et al. |
| 6,324,693 | B1 | 11/2001 | Brodersen et al. |
| 6,336,137 | B1 | 1/2002 | Lee et al. |
| D454,139 | S | 3/2002 | Feldcamp et al. |
| 6,367,077 | B1 | 4/2002 | Brodersen et al. |
| 6,393,605 | B1 | 5/2002 | Loomans |
| 6,405,220 | B1 | 6/2002 | Brodersen et al. |
| 6,434,550 | B1 | 8/2002 | Warner et al. |
| 6,446,089 | B1 | 9/2002 | Brodersen et al. |
| 6,535,909 | B1 | 3/2003 | Rust |
| 6,549,908 | B1 | 4/2003 | Loomans |
| 6,553,563 | B2 | 4/2003 | Ambrose et al. |
| 6,560,461 | B1 | 5/2003 | Fomukong et al. |
| 6,574,635 | B2 | 6/2003 | Stauber et al. |
| 6,577,726 | B1 | 6/2003 | Huang et al. |
| 6,601,087 | B1 | 7/2003 | Zhu et al. |
| 6,604,117 | B2 | 8/2003 | Lim et al. |
| 6,604,128 | B2 | 8/2003 | Diec |
| 6,609,150 | B2 | 8/2003 | Lee et al. |
| 6,621,834 | B1 | 9/2003 | Scherpbier et al. |
| 6,654,032 | B1 | 11/2003 | Zhu et al. |
| 6,665,648 | B2 | 12/2003 | Brodersen et al. |
| 6,665,655 | B1 | 12/2003 | Warner et al. |
| 6,684,438 | B2 | 2/2004 | Brodersen et al. |
| 6,711,565 | B1 | 3/2004 | Subramaniam et al. |
| 6,724,399 | B1 | 4/2004 | Katchour et al. |
| 6,728,702 | B1 | 4/2004 | Subramaniam et al. |
| 6,728,960 | B1 | 4/2004 | Loomans et al. |
| 6,732,095 | B1 | 5/2004 | Warshavsky et al. |
| 6,732,100 | B1 | 5/2004 | Brodersen et al. |
| 6,732,111 | B2 | 5/2004 | Brodersen et al. |
| 6,754,681 | B2 | 6/2004 | Brodersen et al. |
| 6,763,351 | B1 | 7/2004 | Subramaniam et al. |
| 6,763,501 | B1 | 7/2004 | Zhu et al. |
| 6,768,904 | B2 | 7/2004 | Kim |
| 6,772,229 | B1 | 8/2004 | Achacoso et al. |
| 6,782,383 | B2 | 8/2004 | Subramaniam et al. |
| 6,804,330 | B1 | 10/2004 | Jones et al. |
| 6,826,565 | B2 | 11/2004 | Ritchie et al. |
| 6,826,582 | B1 | 11/2004 | Chatterjee et al. |
| 6,826,745 | B2 | 11/2004 | Coker |
| 6,829,655 | B1 | 12/2004 | Huang et al. |
| 6,842,748 | B1 | 1/2005 | Warner et al. |
| 6,850,895 | B2 | 2/2005 | Brodersen et al. |
| 6,850,949 | B2 | 2/2005 | Warner et al. |
| 7,062,502 | B1 | 6/2006 | Kesler |
| 7,069,231 | B1 | 6/2006 | Cinarkaya et al. |
| 7,181,758 | B1 | 2/2007 | Chan |
| 7,289,976 | B2 | 10/2007 | Kihneman et al. |
| 7,340,411 | B2 | 3/2008 | Cook |
| 7,356,482 | B2 | 4/2008 | Frankland et al. |
| 7,401,094 | B1 | 7/2008 | Kesler |
| 7,412,455 | B2 | 8/2008 | Dillon |
| 7,508,789 | B2 | 3/2009 | Chan |
| 7,620,655 | B2 | 11/2009 | Larsson et al. |
| 7,698,160 | B2 | 4/2010 | Beaven et al. |
| 7,730,478 | B2 | 6/2010 | Weissman |
| 7,779,475 | B2 | 8/2010 | Jakobson et al. |
| 8,014,943 | B2 | 9/2011 | Jakobson |
| 8,015,495 | B2 | 9/2011 | Achacoso et al. |
| 8,032,297 | B2 | 10/2011 | Jakobson |
| 8,082,301 | B2 | 12/2011 | Ahlgren et al. |
| 8,095,413 | B1 | 1/2012 | Beaven |
| 8,095,594 | B2 | 1/2012 | Beaven et al. |
| 8,209,308 | B2 | 6/2012 | Rueben et al. |
| 8,275,836 | B2 | 9/2012 | Beaven et al. |
| 8,457,545 | B2 | 6/2013 | Chan |
| 8,484,111 | B2 | 7/2013 | Frankland et al. |
| 8,490,025 | B2 | 7/2013 | Jakobson et al. |
| 8,504,945 | B2 | 8/2013 | Jakobson et al. |
| 8,510,045 | B2 | 8/2013 | Rueben et al. |
| 8,510,664 | B2 | 8/2013 | Rueben et al. |
| 8,566,301 | B2 | 10/2013 | Rueben et al. |
| 8,646,103 | B2 | 2/2014 | Jakobson et al. |
| 10,423,396 | B1 | 9/2019 | Yang |
| 11,269,618 | B1 | 3/2022 | Webster et al. |
| 2001/0044791 | A1 | 11/2001 | Richter et al. |
| 2002/0072951 | A1 | 6/2002 | Lee et al. |
| 2002/0082892 | A1 | 6/2002 | Raffel |
| 2002/0129352 | A1 | 9/2002 | Brodersen et al. |
| 2002/0140731 | A1 | 10/2002 | Subramanian et al. |
| 2002/0143997 | A1 | 10/2002 | Huang et al. |
| 2002/0162090 | A1 | 10/2002 | Parnell et al. |
| 2002/0165742 | A1 | 11/2002 | Robbins |
| 2003/0004971 | A1 | 1/2003 | Gong |
| 2003/0018705 | A1 | 1/2003 | Chen et al. |
| 2003/0018830 | A1 | 1/2003 | Chen et al. |
| 2003/0066031 | A1 | 4/2003 | Laane et al. |
| 2003/0066032 | A1 | 4/2003 | Ramachandran et al. |
| 2003/0069936 | A1 | 4/2003 | Warner et al. |
| 2003/0070000 | A1 | 4/2003 | Coker et al. |
| 2003/0070004 | A1 | 4/2003 | Mukundan et al. |
| 2003/0070005 | A1 | 4/2003 | Mukundan et al. |
| 2003/0074418 | A1 | 4/2003 | Coker et al. |
| 2003/0120675 | A1 | 6/2003 | Stauber et al. |
| 2003/0151633 | A1 | 8/2003 | George et al. |
| 2003/0159136 | A1 | 8/2003 | Huang et al. |
| 2003/0187921 | A1 | 10/2003 | Diec et al. |
| 2003/0189600 | A1 | 10/2003 | Gune et al. |
| 2003/0195950 | A1 | 10/2003 | Huang et al. |
| 2003/0204427 | A1 | 10/2003 | Gune et al. |
| 2003/0206192 | A1 | 11/2003 | Chen et al. |
| 2003/0225730 | A1 | 12/2003 | Warner et al. |
| 2004/0001092 | A1 | 1/2004 | Rothwein et al. |
| 2004/0010489 | A1 | 1/2004 | Rio et al. |
| 2004/0015981 | A1 | 1/2004 | Coker et al. |
| 2004/0027388 | A1 | 2/2004 | Berg et al. |
| 2004/0073549 | A1 | 4/2004 | Turkel et al. |
| 2004/0128001 | A1 | 7/2004 | Levin et al. |
| 2004/0186860 | A1 | 9/2004 | Lee et al. |
| 2004/0193510 | A1 | 9/2004 | Catahan et al. |
| 2004/0199489 | A1 | 10/2004 | Barnes-Leon et al. |
| 2004/0199536 | A1 | 10/2004 | Barnes-Leon et al. |
| 2004/0199543 | A1 | 10/2004 | Braud et al. |
| 2004/0249854 | A1 | 12/2004 | Barnes-Leon et al. |
| 2004/0260534 | A1 | 12/2004 | Pak et al. |
| 2004/0260659 | A1 | 12/2004 | Chan et al. |
| 2004/0268299 | A1 | 12/2004 | Lei et al. |
| 2005/0050555 | A1 | 3/2005 | Exley et al. |
| 2005/0091098 | A1 | 4/2005 | Brodersen et al. |
| 2006/0021019 | A1 | 1/2006 | Hinton et al. |
| 2007/0074215 | A1 | 3/2007 | Bethea et al. |
| 2008/0249972 | A1 | 10/2008 | Dillon |
| 2008/0294615 | A1 | 11/2008 | Furuya et al. |
| 2009/0063414 | A1 | 3/2009 | White et al. |
| 2009/0100342 | A1 | 4/2009 | Jakobson |
| 2009/0177744 | A1 | 7/2009 | Marlow et al. |
| 2009/0183111 | A1 | 7/2009 | Adams |
| 2011/0054776 | A1 | 3/2011 | Petrov |
| 2011/0197032 | A1 | 8/2011 | Patey |
| 2011/0247051 | A1 | 10/2011 | Bulumulla et al. |
| 2012/0042218 | A1 | 2/2012 | Cinarkaya et al. |
| 2012/0218958 | A1 | 8/2012 | Rangaiah |
| 2012/0233137 | A1 | 9/2012 | Jakobson et al. |
| 2012/0316955 | A1 | 12/2012 | Panguluri et al. |
| 2013/0162529 | A1* | 6/2013 | Turk ..................... G06Q 10/00 |
| | | | 345/157 |
| 2013/0212497 | A1 | 8/2013 | Zelenko et al. |
| 2013/0218948 | A1 | 8/2013 | Jakobson |
| 2013/0218949 | A1 | 8/2013 | Jakobson |

(56) References Cited

U.S. PATENT DOCUMENTS

| | | |
|---|---|---|
| 2013/0218966 A1 | 8/2013 | Jakobson |
| 2013/0247216 A1 | 9/2013 | Cinarkaya et al. |
| 2014/0143710 A1 | 5/2014 | Zhao et al. |
| 2014/0215312 A1 | 7/2014 | Hicks et al. |
| 2014/0280483 A1 | 9/2014 | Schmidt et al. |
| 2014/0280522 A1 | 9/2014 | Watte |
| 2015/0026692 A1 | 1/2015 | Ghosh |
| 2015/0040104 A1 | 2/2015 | Mall et al. |
| 2015/0295987 A1 | 10/2015 | Finocchiaro et al. |
| 2017/0169114 A1 | 6/2017 | Ben-Tzur |
| 2018/0040036 A1 | 2/2018 | Dor et al. |
| 2018/0121426 A1 | 5/2018 | Barsness et al. |
| 2020/0117756 A1 | 4/2020 | Garimella et al. |
| 2020/0349207 A1 | 11/2020 | Venkiteswaran et al. |
| 2021/0232639 A1 | 7/2021 | P |
| 2021/0397438 A1 | 12/2021 | Sirov |
| 2022/0129282 A1 | 4/2022 | Lee et al. |
| 2022/0261260 A1 | 8/2022 | Momchilov |
| 2022/0385671 A1 | 12/2022 | Silverstein |
| 2023/0037019 A1 | 2/2023 | Mata Rodriguez et al. |
| 2023/0098023 A1 | 3/2023 | Kirmse |

* cited by examiner

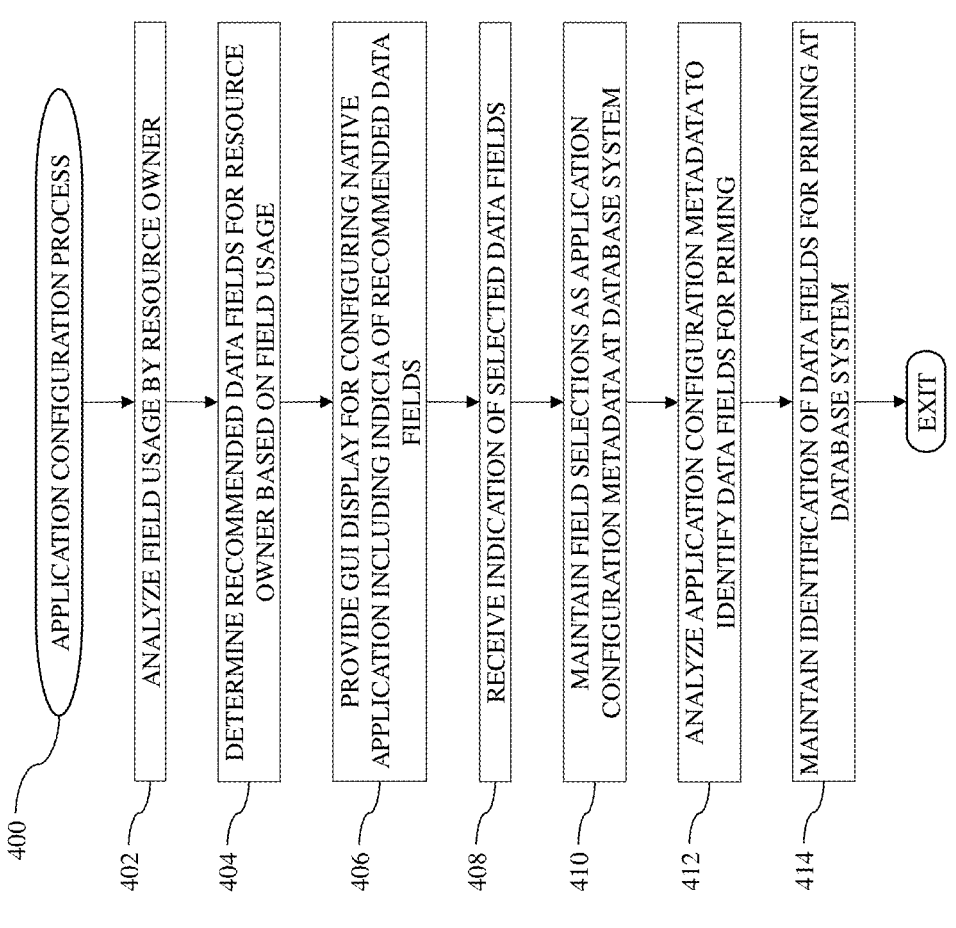

FIG. 4

400 — APPLICATION CONFIGURATION PROCESS

402 — ANALYZE FIELD USAGE BY RESOURCE OWNER

404 — DETERMINE RECOMMENDED DATA FIELDS FOR RESOURCE OWNER BASED ON FIELD USAGE

406 — PROVIDE GUI DISPLAY FOR CONFIGURING NATIVE APPLICATION INCLUDING INDICIA OF RECOMMENDED DATA FIELDS

408 — RECEIVE INDICATION OF SELECTED DATA FIELDS

410 — MAINTAIN FIELD SELECTIONS AS APPLICATION CONFIGURATION METADATA AT DATABASE SYSTEM

412 — ANALYZE APPLICATION CONFIGURATION METADATA TO IDENTIFY DATA FIELDS FOR PRIMING

414 — MAINTAIN IDENTIFICATION OF DATA FIELDS FOR PRIMING AT DATABASE SYSTEM

EXIT

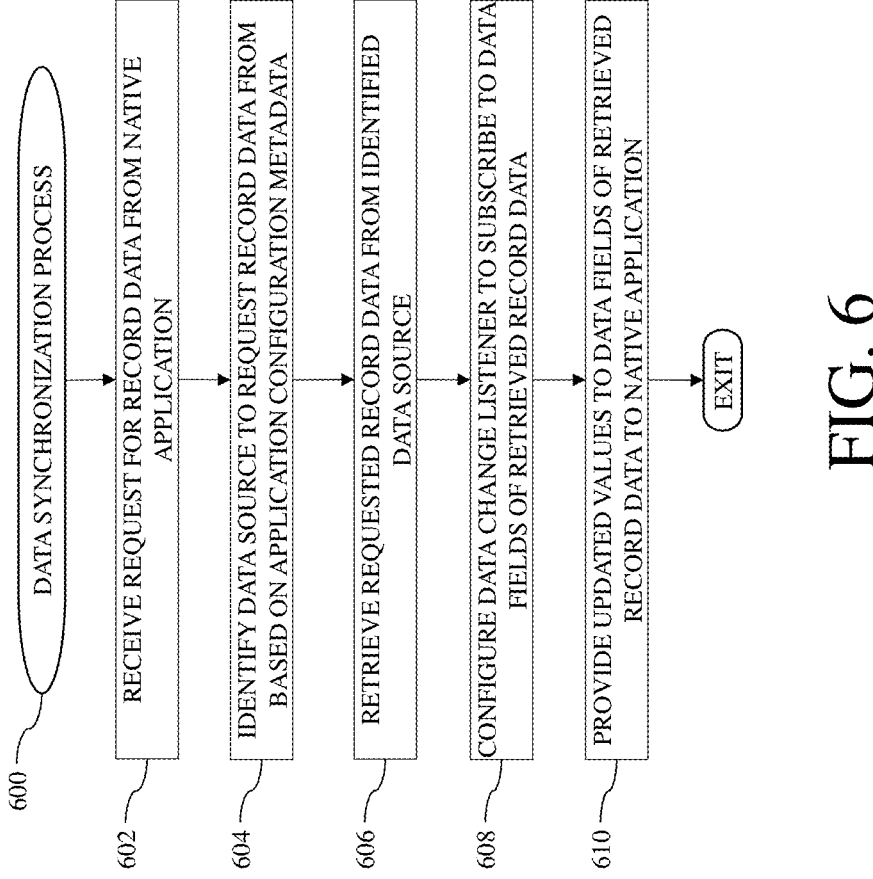

DATA SYNCHRONIZATION PROCESS

RECEIVE REQUEST FOR RECORD DATA FROM NATIVE APPLICATION

IDENTIFY DATA SOURCE TO REQUEST RECORD DATA FROM BASED ON APPLICATION CONFIGURATION METADATA

RETRIEVE REQUESTED RECORD DATA FROM IDENTIFIED DATA SOURCE

CONFIGURE DATA CHANGE LISTENER TO SUBSCRIBE TO DATA FIELDS OF RETRIEVED RECORD DATA

PROVIDE UPDATED VALUES TO DATA FIELDS OF RETRIEVED RECORD DATA TO NATIVE APPLICATION

EXIT

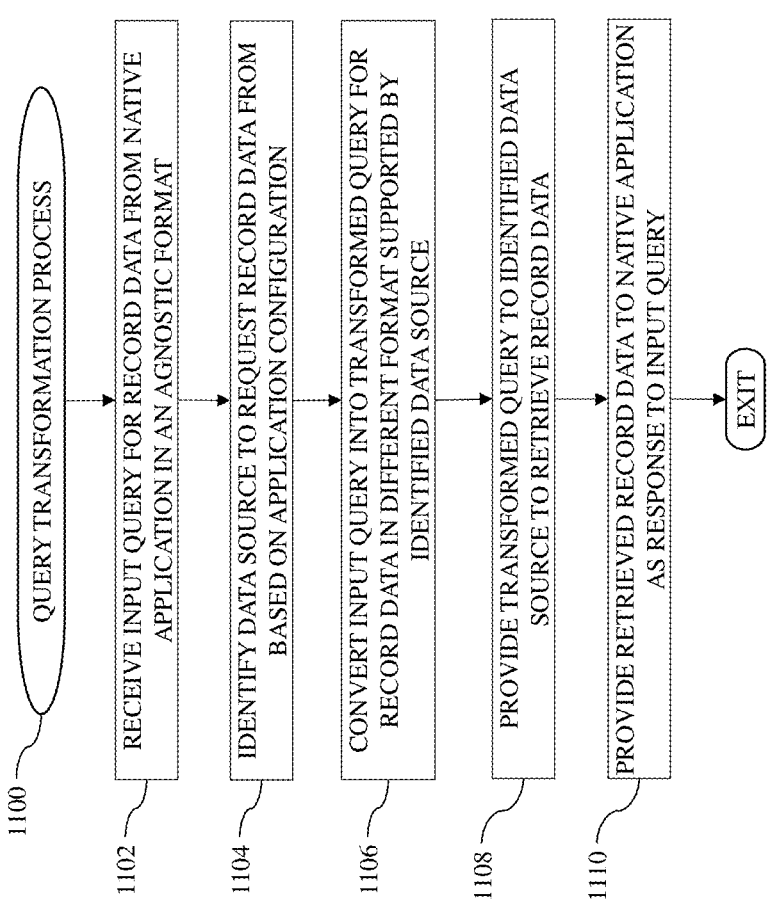

QUERY TRANSFORMATION PROCESS

1100

RECEIVE INPUT QUERY FOR RECORD DATA FROM NATIVE APPLICATION IN AN AGNOSTIC FORMAT

1102

IDENTIFY DATA SOURCE TO REQUEST RECORD DATA FROM BASED ON APPLICATION CONFIGURATION

1104

CONVERT INPUT QUERY INTO TRANSFORMED QUERY FOR RECORD DATA IN DIFFERENT FORMAT SUPPORTED BY IDENTIFIED DATA SOURCE

1106

PROVIDE TRANSFORMED QUERY TO IDENTIFIED DATA SOURCE TO RETRIEVE RECORD DATA

1108

PROVIDE RETRIEVED RECORD DATA TO NATIVE APPLICATION AS RESPONSE TO INPUT QUERY

1110

EXIT

FIG. 11

```
std::shared_ptr<RecordQuery> ResourceAbsenceLoaderImpl::getQueryForResourceAbsence(const RecordQueryFactory
&recordQueryFactory,
const std::string &serviceResourceId,
const std::vector<std::string> &queryFields,
const int32_t &daysBefore,
const int32_t &daysAfter,
const std::vector<std::string> &excludedTypes) {
const auto builder = recordQueryFactory.createRecordQueryBuilder(ResourceAbsence::OBJECT_TYPE_NAME);

const auto filterGroup = builder->createFilterGroup(RqLogicOperator::AND)
->addPbf(RqPbf::forString(ResourceAbsence::RESOURCE_ID, RqStringOperator::EQUALS, serviceResourceId))
->addPbf(RqPbf::forDateLiteralN(ResourceAbsence::ABSENCE_START_TIME, RqTimePointOperator::GREATER_EQUALS,
RqDateLiteralNType::LAST_N_DAYS, daysBefore))
->addPbf(RqPbf::forDateLiteralN(ResourceAbsence::ABSENCE_START_TIME, RqTimePointOperator::LESS_EQUALS,
RqDateLiteralNType::NEXT_N_DAYS, daysAfter));

if (!excludedTypes.empty()) {
filterGroup->addPbf(RqPbf::forStringArray(ResourceAbsence::ABSENCE_TYPE, RqListOperator::NOT_IN,
std::vector<std::optional<std::string>>(excludedTypes.begin(), excludedTypes.end())));
} return builder
->withFields(queryFields)
->setWhere(filterGroup)
->addOrder(ResourceAbsence::ABSENCE_START_TIME, RqOrder::DESC, RqNullsPosition::FIRST)
->build();
}
```

1300
```
select AbsenceNumber,LastModifiedBy.Alias,Type,Id,Start,End,ResourceId
from ResourceAbsence where ResourceId='0HnB0000000TT4jKAG' and
Start>=last_n_days:45 and Start<=next_n_days:45 and
Type not in ('Lunch') order by Start desc
```
FIG. 13

1400

```
{
sqliteWhere = "json_extract(dataBlob,?)=? COLLATE NOCASE and
date(replace(json_extract(dataBlob,?), '.000+0000','')>=date(?,?) and
date(replace(json_extract(dataBlob,?), '.000+0000','')<=date(?,?) and
(json_extract(dataBlob,?) COLLATE NOCASE not in (?) OR json_extract(dataBlob,?) IS NULL)
order by json_extract(dataBlob,?) desc"
paramList = size=12 {
[0] = "$.ResourceId"
[1] = "0HnB00000000TT4jKAG"
[2] = "$.Start"
[3] = "now"
[4] = "-45 day"
[5] = "$.Start"
[6] = "now"
[7] = "+45 day"
[8] = "$.Type"
[9] = "Lunch"
[10] = "$.Type"
[11] = "$.Start"
}
}
```

FIG. 14

```
{
uiapi {
query {
ResourceAbsence(
where: {
and: [
{ ResourceId: { eq: "0HnB0000000TT4jKAG" } }
{ Start: { gte: { range: { last_n_days: 45 } } } }
{ Start: { lte: { range: { next_n_days: 45 } } } }
{ Type: { nin: ["Lunch"] } }
]
}
orderBy: { Start: { order: DESC, nulls: FIRST } }
first: 2000
) @connection {
edges {
node @resource(type: "Record") {
AbsenceNumber {
value
}
LastModifiedBy @resource(type: "Record") {
Alias {
value
}
}
Type {
value
}
Id
Start {
value
}
End {
value
}
ResourceId {
value
} } } } } } }
```

Status Update

Status updated to In Progress

9:00 AM - 10:00 AM
SA-0118 * Installation * Norco Medical, Inc.

Got it

FIG. 20

DATABASE SYSTEMS AND METHODS FOR CLIENT-SIDE INITIATION OF SERVER-SIDE ACTIONS

CROSS-REFERENCE TO RELATED APPLICATION(S)

This application is a continuation of U.S. application Ser. No. 17/822,509, filed Aug. 26, 2022, the contents of which are hereby incorporated by reference.

TECHNICAL FIELD

One or more implementations relate to the field of database systems, and more specifically, to a client-side service that supports client interactions with records at a database system in a standardized manner across different operating systems or application configurations.

BACKGROUND

Modern software development has evolved towards web applications or cloud-based applications that provide access to data and services via the Internet or other networks. For example, social media platforms and other collaborative web sites allow users to exchange direct messages or form groups for broadcasting messages and collaborating with one another. In business environments and customer relationship management (CRM) contexts, communication platforms facilitate users sharing information about sales opportunities or other issues surrounding products or services and track changes to projects and sales opportunities by receiving broadcast updates about coworkers, files, and other project related data objects.

In contrast to traditional systems that host networked applications on dedicated server hardware, a "cloud" computing model allows applications to be provided over the network "as a service" or "on-demand" by an infrastructure provider. The infrastructure provider typically abstracts the underlying hardware and other resources used to deliver a customer-developed application so that the customer no longer needs to operate and support dedicated server hardware. Multi-tenant cloud-based architectures have been developed to support multiple user groups (also referred to as "organizations" or "tenants") using a common hardware and software platform. Some multi-tenant database systems include an application platform that supports a customizable user experience, for example, to create custom applications, web pages, reports, tables, functions, and/or other objects or features.

In practice, it is desirable to provide mobile applications that allow users to interact with a cloud-based database system to retrieve and access data and other cloud-based services or functionality at a user's cellular phone, tablet or other mobile device. However, different mobile devices may utilize different underlying operating systems, which adds to the burden of a cloud-based system operator to support common features and functionality across different mobile device operating systems. Moreover, in some instances, it may be desirable to support more customizable user experiences with custom extensions that can be integrated with the mobile application, adding another layer of complexity between the cloud-based data system and the end user. Accordingly, it is desirable to increase potential customizations to increase productivity and improve user experiences in a standard manner that can accommodate different operating systems and customizations without the overhead of replicating data and/or services or having to create one-off solutions to individually support each particular combination of operating system and application configuration.

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIG. 4 is a flow diagram illustrating an application configuration process suitable for implementation in connection with a computing system of FIGS. 1-3 according to some example implementations;

FIG. 6 is a flow diagram illustrating a data synchronization process suitable for implementation in connection with a computing system of FIGS. 1-3 according to some example implementations;

FIG. 11 is a flow diagram illustrating a query transformation process suitable for implementation in connection with a computing system of FIGS. 1-3 according to some example implementations;

FIG. 12 depicts an exemplary input query and FIGS. 13-15 depict transformed representations of the input query of FIG. 12 having different formats that are suitable for implementation in connection with the query transformation process of FIG. 11 according to some example implementations;

FIG. 20 depicts an example update configuration GUI display suitable for presentation by a virtual application on a client device in connection with the contextual updating process of FIG. 17 according to an example implementation.

DETAILED DESCRIPTION

The following description describes implementations for enabling native applications and application extensions associated therewith interacting with records at a database system using a client-side cross-platform service that supports create, read, update, and delete (CRUD) operations in a manner that abstracts underlying details to support both online and offline operation. For example, in one or more implementations, the native application is realized as a field service application that is capable of being downloaded and installed at a client mobile device (e.g., a cellular phone, a smartphone, a tablet, or the like), with the cross-platform service being integrated with the field service application to support both online or offline operation of the field service application (e.g., when the mobile device is not connected to a network), including functionality of application extensions that may be incorporated or otherwise integrated into the field service application. In this regard, the cross-platform service is capable of supporting the native applications and application extensions independent of the particular operating system at the client device or the particular configuration of the native application or the application extension and enables invariable support of graphical user interface (GUI) displays that are defined client-side (e.g., by the application extension and/or a native application) or server-side, as described in greater detail below.

Figure 1:
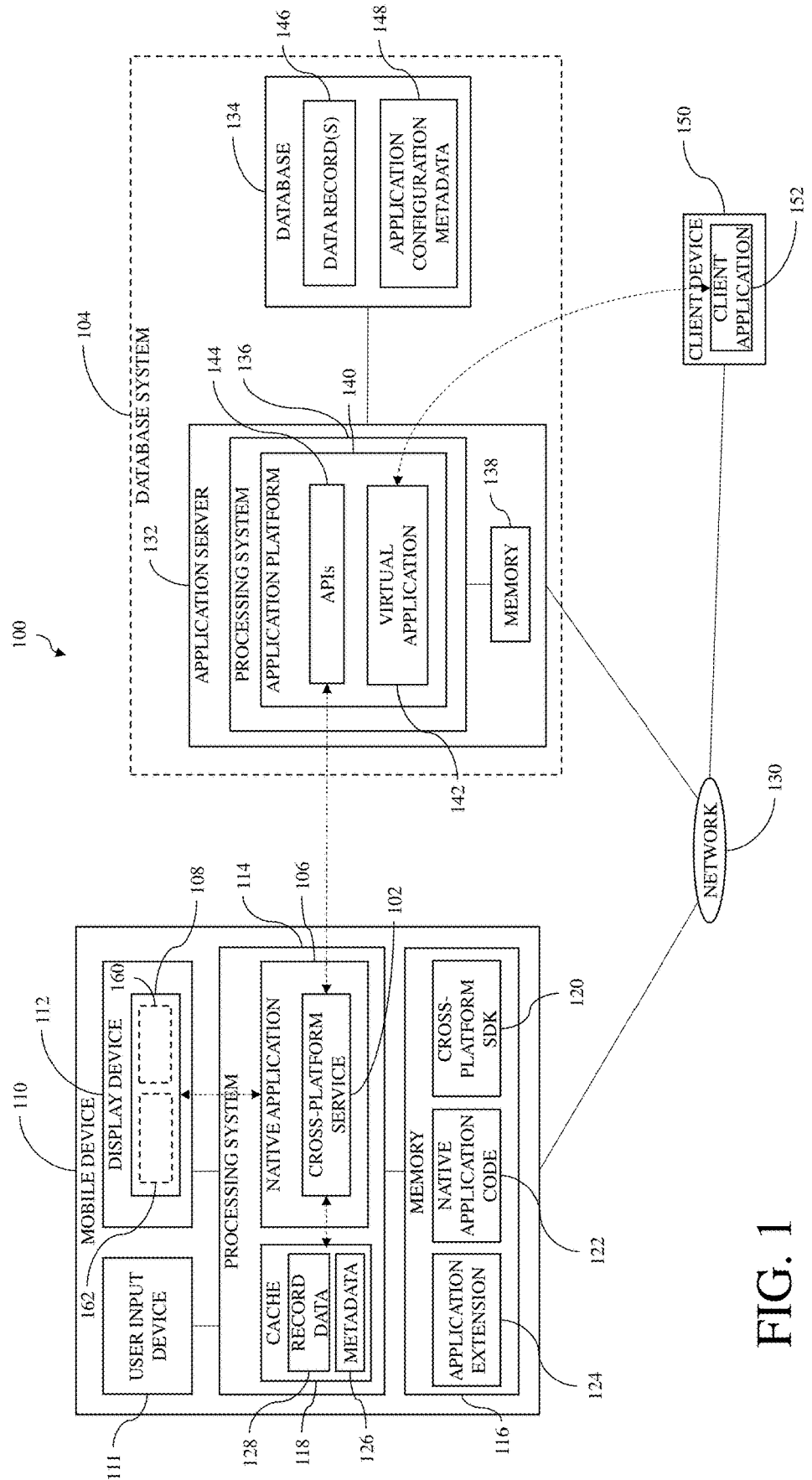
FIG. 1 is a block diagram illustrating a computing system that includes a cross-platform service between a native application and a database system according to some example implementations.

FIG. 1 depicts an exemplary computing system 100 that includes a client-side service 102 capable of supporting interactions between a database system 104 and a native application 106 executing at a client mobile device 110 to support one or more GUI displays 108 generated or otherwise provided by the native application 106 on a display device 112 of the mobile device 110. It should be appreciated that FIG. 1 is a simplified representation of a computing system 100 and is not intended to be limiting. In the illustrated implementation, the database system 104 includes one or more servers 132 that users of client mobile devices 110 may interact with, over a communications network 130 (e.g., the Internet or any sort or combination of wired and/or wireless computer network, a cellular network, a mobile broadband network, a radio network, or the like), by using the native application 106 to view, access or obtain data or other information from one or more data records 146 at a database 134 or other repository associated with the database system 104.

In one or more exemplary implementations, the database system 104 includes one or more application servers 132 that support an application platform 140 capable of providing instances of virtual applications 142, over the network 130, to any number of client devices 110, 150 that users may interact with to obtain data or other information from one or more data records 146 maintained in one or more data tables at the database 134 associated with the database system 104. For example, the database 134 may maintain, on behalf of a user, tenant, organization or other resource owner, data records 146 entered or created by that resource owner (or users associated therewith), files, objects or other records uploaded by the resource owner (or users associated therewith), and/or files, objects or other records automatically generated by one or more computing processes (e.g., by the server 132 based on user input or other records or files stored in the database 134). In this regard, in one or more implementations, the database system 104 is realized as an on-demand multi-tenant database system that is capable of dynamically creating and supporting virtual applications 142 based upon data from a common resource database 134 that is shared between multiple tenants, which may alternatively be referred to herein as a multi-tenant database. Data and services generated by the virtual applications 142 may be provided via the network 130 to any number of client devices, as desired, where instances of the virtual application may be suitably generated at run-time (or on-demand) using a common application platform 140 that securely provides access to the data in the database 134 for each of the various tenants subscribing to the multi-tenant system.

The application server 132 generally represents the one or more server computing devices, server computing systems or other combination of processing logic, circuitry, hardware, and/or other components configured to support remote access to data records maintained in the data tables at the database 134 via the network 130. Although not illustrated in FIG. 1, in practice, the database system 104 may include any number of application servers 132 in concert with a load balancer that manages the distribution of network traffic across different servers 132 of the database system 104.

In exemplary implementations, the application server 132 generally includes at least one processing system 136, which may be implemented using any suitable processing system and/or device, such as, for example, one or more processors, central processing units (CPUs), controllers, microprocessors, microcontrollers, processing cores, application-specific integrated circuits (ASICs) and/or other hardware computing resources configured to support the operation of the processing system described herein. Additionally, although not illustrated in FIG. 1, in practice, the application server 132 may also include one or more communications interfaces, which include any number of transmitters, receiver, transceivers, wired network interface controllers (e.g., an Ethernet adapter), wireless adapters or another suitable network interface that supports communications to/from the network 130 coupled thereto. The application server 132 also includes or otherwise accesses a data storage element 138 (or memory), and depending on the implementation, the memory 138 may be realized as a random-access memory (RAM), read-only memory (ROM), flash memory, magnetic or optical mass storage, or any other suitable non-transitory short- or long-term data storage or other computer-readable media, and/or any suitable combination thereof. In exemplary implementations, the memory 138 stores code or other computer-executable programming instructions that, when executed by the processing system 136, are configurable to cause the processing system 136 to support or otherwise facilitate the application platform 140 and the subject matter described herein.

In exemplary implementations, the code or other computer-executable programming instructions maintained in the memory 138 are executable by the processing system 136 at the application server 132 to provide one or more application programming interfaces 144 (APIs) that are configurable to allow client devices 110, 150 to interact with data records 146 or other configuration metadata 148 maintained at the database 134 via the application server 132. For example, some non-limiting examples of standard APIs 144 supported by the application platform 140 can include, but are not limited to, Simple Object Access Protocol (SOAP) API(s), representational state transfer (REST) API(s), bulk API(s), streaming API(s), Chatter REST API(s), user interface API(s), analytics REST API(s), metadata API(s), APEX® REST API(S), APEX® SOAP API(s), tooling API(s) and the like. REST and SOAP APIs are two commonly used APIs to expose data from an application platform 140 to other platforms or to allow external applications to invoke APEX® methods. For example, a REST API may support HTTP requests to access and use data to perform create, read, update, and delete (CRUD) operations concerning resources (e.g., create, read, update, and delete data records 146), which are referred to as GET, POST, PUT, and DELETE operations in REST API parlance. A SOAP API may support XML and be used to create, update, delete, retrieve (CRUD) records in any language that supports web services, and may be utilized to maintain passwords, perform searches, retrieve metadata, etc. A bulk API may be realized as a specialized REST API for loading and querying large amounts of data at once, and in some implementations, a bulk API may be asynchronous, such that a response with results can come back at some arbitrary time later (within a timeout window) after a request is submitted. A streaming API is a specialized API for setting up notifications that trigger when changes are made to data (e.g., to the values for one or more data fields of one or more data records 146) using a publish-subscribe (pub/sub) model in which clients can subscribe to channels that broadcast certain types of data changes to reduce the number of API requests and eliminate the need for polling.

In exemplary implementations, the database 134 stores or otherwise maintains data for integration with or invocation by the virtual application 142 in objects having corresponding data records 146 organized in object tables. In this regard, the database 134 may include any number of different object tables configured to store or otherwise maintain alphanumeric values or other descriptive information that define a particular instance of a respective type of object associated with a respective object table. For example, the virtual application 142 may support a number of different types of objects that may be incorporated into or otherwise depicted or manipulated by the virtual application 142, with each different type of object having a corresponding object table that includes columns or fields corresponding to the different parameters or criteria that define a particular instance of that object. In addition to standard objects that may be supported by the application platform 140 and/or the native application 106 across different resource owners, organizations or tenants, the database 134 may also store or otherwise maintain custom objects for association and/or integration with the application platform 140 and/or the native application 106. For example, an administrator user associated with a particular resource owner may utilize an instance of a virtual application 142 to create or otherwise define a new custom field to be added to or associated with a standard object, or define a new custom object type that includes one or more new custom fields associated therewith. In this regard, the database 134 may also store or otherwise maintain metadata that defines or describes the fields, process flows, workflows, formulas, business logic, structure and other database components or constructs that may be associated with a particular database object. In various implementations, the database 134 may also store or otherwise maintain validation rules providing validation criteria for one or more fields (or columns) of a particular database object type, such as, minimum and/or maximum values for a particular field, a range of allowable values for the particular field, a set of allowable values for a particular field, or the like, along with workflow rules or logical criteria associated with respective types of database object types that define actions, triggers, or other logical criteria or operations that may be performed or otherwise applied to entries in the various database object tables (e.g., in response to creation, changes, or updates to a record in an object table).

In some implementations, in addition to the metadata and rules associated with a particular type of database object, the database 134 stores or otherwise maintains application configuration metadata 148 that includes different parameters or criteria that define a particular configuration to be applied to instances of the native application 106 and/or the virtual application 142 for users associated with a particular resource owner, tenant or organization. In this regard, the application configuration metadata 148 may include values or fields that define the layout, sequencing, and other characteristics or parameters associated with one or more GUI displays 108 and/or GUI display components 160 incorporated therein to be presented by an instance of the native application 106 executing on a mobile device 110 associated with a user affiliated with that particular resource owner. The application configuration metadata 148 may also include additional settings or configurations associated with the native application 106, as described in greater detail below. Moreover, in some implementations, the application configuration metadata 148 may define different process flows, workflows, actions, triggers, or other logical criteria or operations that may be performed or otherwise applied at the database system 104 responsive to client-side events or other indicia received from the cross-platform service 102.

Still referring to FIG. 1, the mobile device 110 generally represents an electronic device coupled to the network 130 that may be utilized by a user to access a native application 106 executing on or at the mobile device 110 that supports interaction with the database system 104. In exemplary embodiments, the mobile device 110 is realized as any sort of mobile phone, cellular phone, smartphone, table or other network-enabled electronic device coupled to the network 130 that executes or otherwise supports the native application 106 that allows a user to access one or more GUI displays 108 provided by the native application 106. In exemplary implementations, the mobile device 110 includes a display device 112, such as a monitor, screen, or another conventional electronic display, capable of graphically presenting data and/or information along with a user input device 111, such as a touchscreen, a touch panel, a sensor, or the like, capable of receiving input from the user of the mobile device 110. The display device 112, the user input device 111 and other input/output interfaces associated with the mobile device 110 are coupled to a processing system 114, which may be implemented using any suitable processing system and/or device, such as, for example, one or more processors, central processing units (CPUs), controllers, microprocessors, microcontrollers, processing cores, application-specific integrated circuits (ASICs) and/or other hardware computing resources configured to support the operation of the mobile device 110 described herein. In exemplary implementations, the processing system 114 is coupled to a data storage element 116 (or memory), which may be realized as a random-access memory (RAM), read-only memory (ROM), flash memory, magnetic or optical mass storage, or any other suitable non-transitory short- or long-term data storage or other computer-readable media, and/or any suitable combination thereof.

In exemplary implementations, the memory 116 of the mobile device 110 stores code or other computer-executable programming instructions associated with the native application 106 (e.g., native application code 122) that, when executed by the processing system 114, are configurable to cause the processing system 114 to generate, support, provide or otherwise facilitate an instance of the native application 106 at the mobile device 110. In one or more implementations, the native application code 122 may be realized as a managed or distributed software package (or code package) that is published or otherwise made available to other users for installation or integration, where the software package generally includes a bundle of components that make up the native application 106 (and the functionality thereof) that may be integrated with or otherwise supported by an operating system of the mobile device 110 to interact with the database objects or other data records 146 maintained at the database system 104 independent of the application platform 140 and/or the virtual application 142. For example, the native application code 122 may be realized as one or more class files or objects within a file, folder, or other software package (e.g., a ZIP file, a file folder, or other logical container) corresponding to the instance of the native application 106 that are downloaded from the database system 104 over the network 130 and stored in the memory 116 for subsequent execution by the processing system 114.

In exemplary implementations, the memory 116 of the mobile device 110 also stores code or other computer-executable programming instructions associated with the cross-platform service 102 that is integrated with, invoked by or otherwise incorporated into the native application 106 (e.g., the cross-platform software development kit (SDK) 120). In this regard, the cross-platform SDK 120, when executed by the processing system 114, causes the processing system 114 to generate, support, provide or otherwise facilitate the cross-platform service 102 and the related features, functionality, operations and/or processes described herein in connection with the instance of the native application 106 at the mobile device 110. In one or more implementations, similar to the native application code 122, the cross-platform SDK 120 may be realized as a managed or distributed software package (or code package) that is published or otherwise made available to other users for installation or integration with instances of the native application 106. For example, in one implementation, an administrator associated with a resource owner may utilize a client device 150 to configure metadata 148 associated with the configuration of instances of the native application 106 associated with that resource owner to include or otherwise incorporate the cross-platform SDK 120 with the native application code 122, such that when users associated with that resource owner download the software package for the native application 106, the cross-platform SDK 120 is automatically included and integrated with the native application code 122 at the mobile device 110.

In the illustrated implementation in FIG. 1, the memory 116 of the mobile device 110 also stores code or other computer-executable programming instructions associated with an application extension 124 that is integrated with, invoked by or otherwise incorporated into the native application 106. In this regard, the application extension code 124, when executed by the processing system 114, causes the processing system 114 to generate, support, provide or otherwise facilitate further customization of the GUI displays 108 or other custom features, functionality, operations and/or processes to be incorporated into or integrated with the native application 106. For example, the application extension code 124 may be configurable to provide a customized component 162 that can be integrated with or into one or more of the GUI displays 108 generated by the native application 106. Similar to the native application code 122 and the cross-platform SDK 120, the application extension code 124 may be downloaded from the database system 104 and installed at the mobile device 110 in connection with the download and the installation of the native application code 122 and the cross-platform SDK 120. For example, in one implementation, the application extension code 124 may be realized using an application extension object in the database 134 that stores or otherwise maintains columns or fields of values corresponding to the different parameters or criteria that customize native application 106 or the GUI displays 108 associated therewith, for example, by defining a custom GUI display component 162 to be incorporated into a particular GUI display 108 associated with the native application 106. Similar to the application configuration metadata 148, an administrator associated with a resource owner may utilize a client device 150 to configure data records 146 for application extension objects to be associated with instances of the native application 106 associated with that resource owner, such that when users associated with that resource owner download the software package for the native application 106, the corresponding application extension code 124 embodied by the application extension objects is downloaded and automatically included and integrated with the native application code 122 at the mobile device 110. In this regard, an application extension and its associated functionality may be specific to a particular resource owner or user as a customization applied to or in addition to the underlying core functionality provided by the native application 106 and supported by the database system 104 across all users or resources owners.

The client device 150 generally represents an electronic device coupled to the network 130 that may be utilized by a user to access an instance of the virtual application 142 using an application 152 executing on or at the client device 150. In practice, the client device 150 can be realized as any sort of personal computer, mobile telephone, tablet or other network-enabled electronic device coupled to the network 130 that executes or otherwise supports a web browser or other client application 152 that allows a user to access one or more GUI displays provided by the virtual application 142. In exemplary implementations, the client device 150 includes a display device, such as a monitor, screen, or another conventional electronic display, capable of graphically presenting data and/or information along with a user input device 111, such as a touchscreen, a touch panel, a sensor, or the like, capable of receiving input from the user of the client device 150. The illustrated client device 150 executes or otherwise supports a client application 152 that communicates with the application platform 140 provided by the processing system 136 at the application server 132 to access an instance of the virtual application 142 using a networking protocol. In some implementations, the client application 152 is realized as a web browser or similar local client application executed by the client device 150 that contacts the application platform 140 at the application server 132 using a networking protocol, such as the hypertext transport protocol (HTTP). In this manner, in one or more implementations, the client application 152 may be utilized to access or otherwise initiate an instance of a virtual application 142 hosted by the database system 104, where the virtual application 142 provides one or more web page GUI displays within the client application 152 that include GUI elements for interfacing and/or interacting with records 146 and/or metadata 148 maintained at the database 134. In this regard, an administrator user associated with a particular resource owner may utilize the client application 152 to access an instance of the virtual application 142 to configure the data records 146 for the application extension objects to be incorporated with instances of the native application 106 for users associated with that particular resource owner as well as configuring the application configuration metadata 148 that defines, controls or otherwise customizes the GUI displays 108, the native application GUI display components 160 and/or the functionality of the native application 106, as described in greater detail below.

In one or more implementations, the database 134 stores or otherwise maintains data records 146 for one or more database objects that may be referenced or otherwise invoked by the application configuration metadata 148 and/or the application extension objects to support incorporation of one or more configurable web components (e.g., custom component 162) into instances of the native application 106 and/or the virtual application 142. In this regard, a configurable web component generally includes Hypertext Markup Language (HTML) code or other presentation code defining the manner in which the configured web component is to be displayed or rendered, JavaScript or other client-side executable behavioral code defining the event-driven behavior of the configured web component, and user-defined metadata including values or properties that are input or otherwise defined for various fields, parameters, variables or other attributes associated with the respective web component. In this regard, in such implementations, the application extension code 124 downloaded to the mobile device 110 may include the HTML code and JavaScript along with other code and/or values that are executed or otherwise referenced by the processing system 114 in connection with executing the native application code 122 for the native application 106 to incorporate custom web components 162 into the GUI displays 108 rendered by the native application 106.

As described in greater detail below, during execution of the native application 106, the application extension(s) and/or the native application 106 interact with the cross-platform service 102 to retrieve data from the database system 104 or another data source to support rendering the GUI displays 108 associated with the native application 106 and support other functionality of the native application 106 and/or the application extension(s). In this regard, upon initialization of the native application 106, the cross-platform service 102 may download or otherwise retrieve, from the database system 104 over the network 130 (e.g., via one or more APIs 144 supported by the application platform 140 at the application server 132), record data 128 from different data records 146 associated with the particular resource owner and/or mobile device end user that are likely to be utilized by the native application 106 and/or the application extension(s) and store or otherwise maintain the downloaded record data 128 in a cache 118 or similar data storage associated with the processing system 114 for quicker access to the record data 128 that is not dependent on the subsequent presence or performance of the network 130. Additionally, the cross-platform service 102 may download or otherwise retrieve, from the database system 104 over the network 130, at least a subset of the application configuration metadata 148 associated with the particular resource owner and/or mobile device end user and store the downloaded metadata 126126 in the cache 118 to support the desired customizations of the GUI displays 108 and/or the native application 106, as described in greater detail below.

Figure 2:
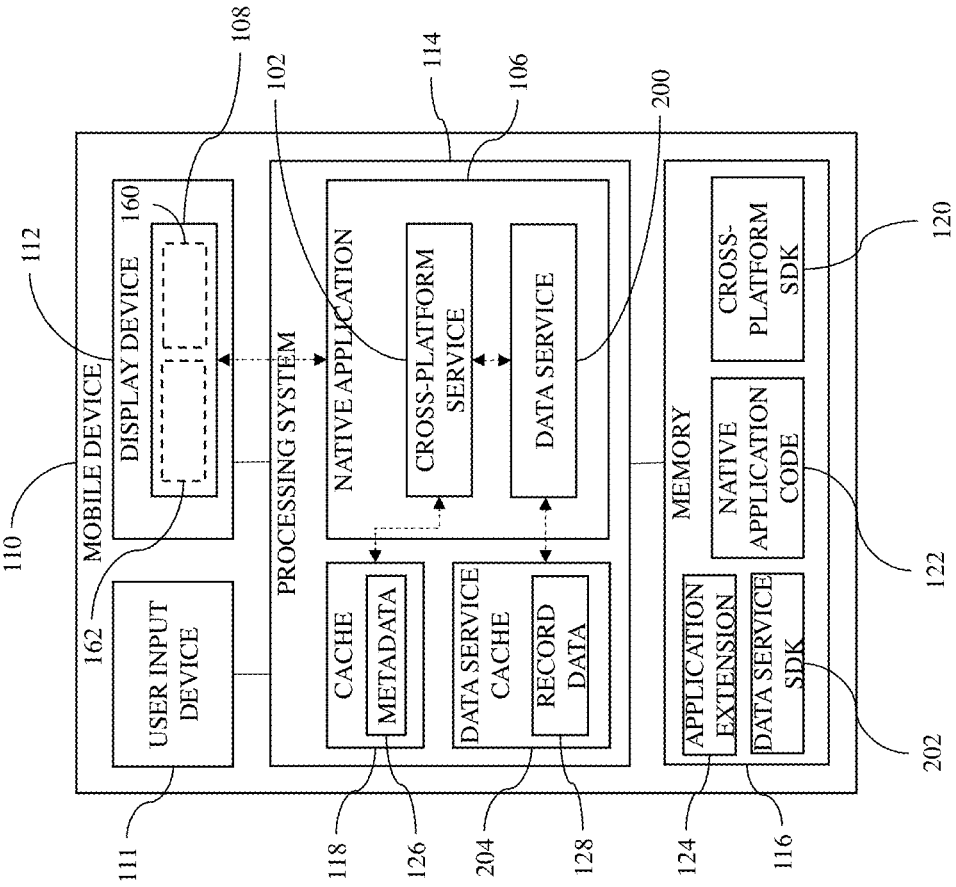
FIG. 2 is a block diagram illustrating a mobile device suitable for use in the computing system that supports a cross-platform service between a native application and a data service that interfaces with the database system according to some example implementations.

Referring to FIG. 2, with continued reference to FIG. 1, in some implementations, the instance of the native application 106 at the mobile device 110 is configured to utilize another client-side data service 200 that supports interactions with the database system 104 and independently maintains its own associated cache of data, alternatively referred to herein as the data service cache 204. In a similar manner as described above, an administrator associated with a resource owner may utilize the client device 150 to modify or otherwise configure the application configuration metadata 148 to include or otherwise incorporate the data service 200, such that the code or other computer-executable programming instructions associated with the data service 200 (e.g., the data service SDK 202) is downloaded from the database system 104 to the memory 116 at the mobile device 110 to be integrated with or otherwise incorporated into the native application 106. To support the data service 200, the cross-platform service 102 downloads the application configuration metadata 148 to the cache 118 that indicates the data service 200 is to be utilized to retrieve data from the data records 146 maintained at the database system 104. Thereafter, when the native application 106 and/or an application extension provides a request for record data to the cross-platform service 102, based on the cached application configuration metadata 126 indicating the data service 200 should be utilized, the cross-platform service 102 generates a corresponding request to the data service 200 for the record data desired by the native application 106 and/or the application extension. In other words, the cross-platform service 102 functions as an intermediary between the native application 106 and the data service 200, thereby allowing the native application 106, the native application code 122 and/or the application extension code 124 to be developed and designed independent of the data service 200 by instead issuing requests to or otherwise invoking the cross-platform service 102, which, in turn allows for server-side control of how the native application 106, the native application code 122 and/or the application extension code 124 obtains data from the data records 146 at the database system 104 based on the application configuration metadata 148.

The data service 200 utilizes one or more APIs 144 at the database system 104 to download record data from the data records 146 corresponding to the various components (e.g., component 162) to be incorporated into the native application 106, and the data service 200 utilizes the local data service cache 204 to support sharing record data across different components that may be integrated into the native application 106 to improve efficiency and reduce complexity. Additionally, the data service 200 and the corresponding data records 146 at the database system 104 (which may include application extension objects) allow for server-side control and customization of the native application 106 to be abstracted from the native application 106 via the data service 200 and the cross-platform service 102. Accordingly, the cross-platform service 102 allows for both the native application 106, the data service 200 and any application extensions to be developed or otherwise designed independently of one another, with the cross-platform service 102 supporting interoperability between the native application 106 and the data service 200 in a standardized manner independent of the operating system or other configuration of the mobile device 110. In one or more implementations, the data service 200 is realized as the Salesforce Lightning Data Service (LDS), where the configuration of the native application 106 to utilize the data service 200 is alternatively referred to herein as the LDS mode.

Figure 3:
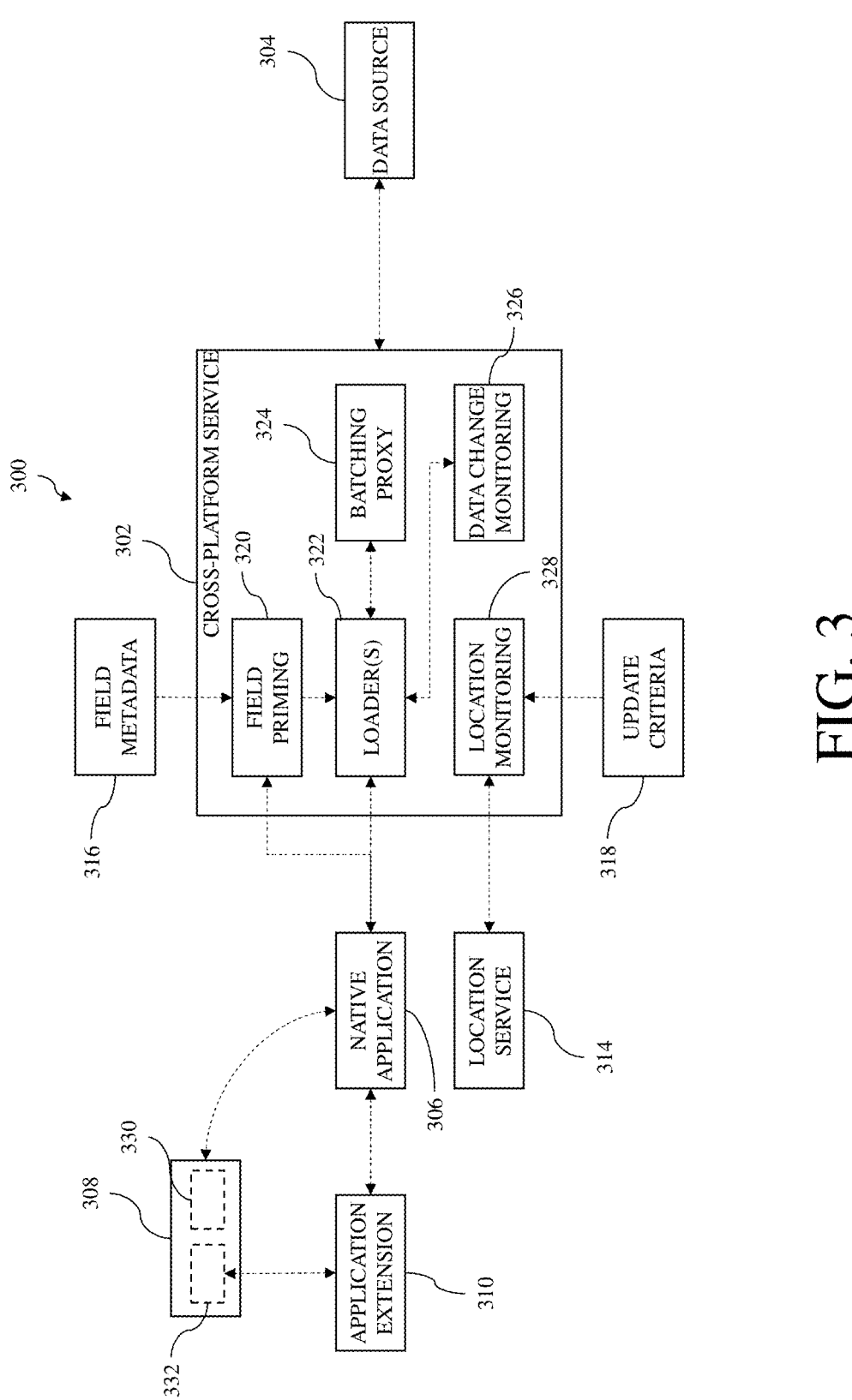
FIG. 3 is a block diagram illustrating a computing system that supports a cross-platform service that interfaces with a data source according to some example implementations.

FIG. 3 depicts an exemplary implementation of a computing system 300 including a cross-platform service 302 suitable for use as the cross-platform service 102 at the mobile device 110 of FIGS. 1-2. As depicted in FIG. 3, the cross-platform service 302 functions as an intermediary between a native application 306 (e.g., native application 106) and a data source 304 to receive requests for record data from the native application 306, which may be initiated by the native application 306 or an application extension 310 (e.g., application extension 124) that is integrated with or otherwise incorporated into the native application 306. The cross-platform service 302 retrieves the requested record data from the appropriate data source 304 and provides a corresponding response to the native application 306, as described in greater detail below. For example, depending on the configuration of the native application 306, the current operating context of the mobile device 110 and/or the particular source of the request (e.g., whether the request is initiated by the native application 306 or the application extension 310, the data source 304 identified by the cross-platform service 302 could be any one of the database system 104, the local cache 118 or the data service 200 (which in turn may retrieve the requested data from the database system 104 or its associated local cache 204). In this regard, the cross-platform service 302 allows for the native application 306 and/or the application extension 310 to be designed or otherwise developed independent of the end point data source 304 by abstracting the details of where the record data is coming from to be handled by the cross-platform service 302.

In the illustrated implementation, the cross-platform service 302 includes a field priming component 320, one or more data transfer components 322 (alternatively referred to herein as loaders), a batching proxy component 324 (alternatively referred to herein as the batching proxy), a data change monitoring component 326 (alternatively referred to herein as the data change manager), and a location monitoring component 328. The components 320, 322, 324, 326, 328 generally represent one or more class files or other executable code or instructions associated with the cross-platform service 302 (e.g., part of the cross-platform SDK 120) that are executed or otherwise utilized by the processing system 114 of the mobile device 110 to provide a corresponding software module that supports or otherwise performs the functionality or operations associated with the respective component 320, 322, 324, 326, 328 described herein.

Referring to FIG. 3 with continued reference to FIGS. 1-2, in exemplary implementations, when the native application 106, 306 is launched or otherwise initiated at the mobile device 110, the native application 106, 306 may provide instructions or other indicia to the field priming component 320 of the cross-platform service 102, 302 to cause the cross-platform service 102, 302 to retrieve or otherwise download record data likely to be utilized by the native application 106, 306 and/or the application extension 124, 310 from the database system 104. The cross-platform service 102, 302 retrieves or otherwise obtains, from the database system 104, configured field metadata 316, which is a subset of the application configuration metadata 148 that indicates the subsets of columns or fields associated with the different data records 146 associated with the resource owner that are utilized or otherwise incorporated in the resource owner's instances of the native application 106, 306 and/or the application extension 124, 310. For example, the virtual application 142 may support an administrator user associated with a resource owner configuring the layout of the GUI displays 108, 308 or other GUI display components 160, 330 to be generated by the native application 106, 306 for a particular type of database object supported by the database system 104 to include or otherwise utilize a particular subset of the fields or columns of the data records 146 corresponding to that particular type of database object while excluding other fields or columns from inclusion in the GUI displays 108, 308 and/or the GUI display components 160, 330, with the application configuration metadata 148 maintaining indicia of the user-configured fields or columns to be utilized for the resource owner.

In response to instructions or other indicia from the native application 106, 306 to prime the fields for the native application 106, 306, the field priming component 320 downloads, from the database system 104 over the network 130, the subset of the application configuration metadata 148 indicative of the subset of data fields for particular types of data records 146 that are associated with one or more layouts of the GUI displays 108, 308 (or components 160, 162, 330, 332 thereof) and stores the configured field metadata 126, 316 in cache 118. Thereafter, when the cross-platform service 102, 302 receives a request for data associated with a data record 146 at the database system 104, the cross-platform service 102, 302 utilizes the cached field metadata 126, 316 to request, retrieve or otherwise download only the configured subset of data fields associated with the data record 146, rather than requesting all of the data fields associated with the data record 146. In this regard, by virtue of the field priming component 320 retrieving and caching the configured field metadata 126, 316, the cross-platform service 102, 302 conserves network bandwidth and other computing resources that might otherwise be utilized to retrieve and download all of the fields of a particular data record 146 by requesting only those data fields of the data record 146 that will actually be utilized for the GUI display(s) 108, 308. Thus, the cross-platform service 102, 302 can more quickly provide the retrieved subset of record data 128 to the native application 106, 306 to generate the GUI display(s) 108, 308 with the user-configured layout(s) and achieve faster data synchronization between the particular data record 146 at the database system 104, the cached record data 128 and the GUI display(s) 108.308.

In exemplary implementations, the cross-platform service 102, 302 utilizes the loaders 322 to request record data and return retrieved record data to the native application 106, 306. In this regard, the loaders 322 are capable of determining which data source 104, 118, 200, 304 that the record data should be loaded from, make corresponding network requests, and manage the cache 118 by validating the record data 128 and keeping the record data 128 current (or up to date). In exemplary implementations, the cross-platform service 102, 302 is configurable to support parent-child relationships between loaders 322. For example, for a particular GUI display 108, 308, a parent loader 322 (alternatively referred to herein as a composite loader) may be created to obtain data for a screen that includes multiple different parts or regions (e.g., one or more menus, the primary or main content, etc.), where child loaders 322 (alternatively referred to herein as atomic loaders) are created to load record data for their respective parts or regions of the screen. The child (or atomic) loaders 322 are responsible for requesting and retrieving the subset of record data 128 pertinent to their respective region or portion of the GUI display 108, 308 and managing the record data 128 in the cache 118, while the parent (or composite) loader 322 does not perform network or cache operations but merely aggregates record data from the different child loaders 322 and responds to a request from the native application 106, 306 with the requisite record data 128 for rendering the respective GUI display 108, 308. For example, a composite loader 322 may be created for a GUI display 108, 308 that includes a first child loader 322 associated a first component 160, 330 of the GUI display 108, 308 and a second child loader 322 associated with a second component 162, 332 of the GUI display 108, 308. Moreover, the child loaders 322 associated with the different components 160, 162, 330, 332 may be realized as composite loaders 322 with additional child loaders 322 created to support multiple data requests associated with the respective component 160, 162, 330, 332. Thus, the loaders 322 may be configured to provide a hierarchical tree structure for propagating individual data requests back up to the appropriate GUI display 108, 308 and/or the appropriate GUI display component 160, 162, 330, 332. In this regard, the loaders 322 include or are otherwise configured to support a callback listener that returns the requested data back to source or originator of the respective loaders 322, such as the parent loader 322 (in the case of a child loader 322) or the native application 106, 306 (in the case of a parent composite loader 322 or an atomic loader 322 that is not a child of a composite loader 322).

In exemplary implementations, the native application 106, 306 and/or the application extension 124, 310 is configured to request record data from the loaders 322 using a query that is formatted in a manner that is independent of the data source 304 to be utilized to satisfy the request. For example, the native application 106, 306 and/or the application extension 124, 310 may be configured to provide queries to the loaders 322 in a standard format that abstracts the data source 304, where the loaders 322 are configured to analyze the received query in relation to the configuration metadata 126 associated with the native application 106, 306, the current configuration of the native application 106, 306 (e.g., whether the user has configured the native application 106, 306 for offline mode) and/or the current operating context associated with the mobile device 110 (e.g., whether or not the mobile device 110 is connected to the network 130) to determine which data source 304 from among the potential data sources 104, 118, 200 should be utilized to retrieve the requested record data. Thereafter, the loaders 322 convert the received query into a transformed query statement with a different format that is associated with or otherwise supported by the identified data source 304.

For example, when the mobile device 110 is connected to the network 130 and the native application 106, 306 is in an online mode and the data service 200 is not enabled (e.g., non-LDS mode), the loaders 322 convert or otherwise translate the received query into a transformed query statement in a query language supported by the database system 104 (e.g., the Salesforce Object Query Language (SOQL)). On the other hand, when the mobile device is not connected to the network 130 or the native application 106, 306 is in an offline mode, the loaders 322 convert or otherwise translate the received query into a transformed query statement in a different query language supported by the local cache 118 (e.g., the Structured Query Language (SQL)). Conversely, when the application configuration metadata 126, 148 indicates the data service 200 is enabled (e.g., LDS mode), the loaders 322 convert or otherwise translate the received query into a transformed query statement in different query language that is supported by the data service 200 (e.g., GraphQL). The loaders 322 then utilize the transformed query to retrieve the desired record data from the identified data source 304 and provides the retrieved record data to the requesting native application 106, 306 and/or the application extension 124, 310 in response to the original query request. In this regard, by virtue of the cross-platform service 102, 302 being capable of receiving a standard abstract query and transforming the query into the appropriate language or format for the appropriate data source 304, designers or developers of the application extension 124, 310 and/or the native application 106, 306 do not have to write queries in different languages or formats or otherwise configure the underlying code 122, 124 to support multiple different query languages or formats.

In exemplary implementations, when the loaders 322 identify the desired data source 304 for the current configuration of the native application 106, 306 to be the database system 104, the network requests for record data (e.g., the transformed queries in the language or format supported by the database system 104) are provided to the batching proxy 324 of the cross-platform service 102, 302. The batching proxy 324 analyzes the network requests received from the loaders 322 to identify or otherwise determine whether different network requests from different loaders 322 can be aggregated or combined into a common batched request. When the batching proxy 324 identifies a set of network requests from the loaders 322 that are combinable or otherwise batchable with one another, the batching proxy 324 automatically generates or otherwise constructs a batched request for record data that includes the individual constituent requests associated with different loaders 322. The batching proxy 324 then transmits or otherwise provides, over the network 130, the batched request to an API 144 at the application server 132 of the database system 104 that is configured to support batched requests. The batch request API 144 at the application server 132 executes or otherwise performs the individual transformed query requests contained in the received batched request to obtain corresponding record data from the data records 146 that are responsive to the respective query request. The batch request API 144 constructs or otherwise generates a batched response that aggregates or otherwise combines the individual constituent responses to the individual constituent requests from the batched request and then transmits or otherwise provides the batched response back to the cross-platform service 102, 302 over the network 130.

The batching proxy 324 receives the batched response from the batch request API 144, and then maps the individual constituent responses contained in the batched response back to the corresponding loader 322 associated with the network request that respective response record data is responsive to. The batching proxy 324 then provides the mapped response record data to the callback listener associated with the respective loader 322, which, in turn, stores the record data 128 to the cache 118 and returns the responsive record data back to the native application 106, 306 and/or the application extension 124, 310 that originally initiated the request for record data (e.g., by providing the record data as a response to the request).

By automatically batching network requests, the cross-platform service 102, 302 reduces the total number of network requests transmitted over the network 130 to improve bandwidth utilization in a manner that is abstracted from the native application 106, 306 and/or the application extension 124, 310 (e.g., a developer of the native application 106, 306 and/or the application extension 124, 310 does not need to modify the corresponding code 122, 124 to support batching). Additionally, the batch request API 144 may be configured to support parallelization and optimize asynchronous processing of the batched queries to avoid failures or timeouts and reduce round trip wait time perceived at the mobile device 110 (e.g., by allowing a GUI display 108, 308 to be populated or updated more quickly) relative to using individual or serial unbatched network requests.

It should be noted that in addition to requesting or retrieving data from the data source 304, the loaders 322 and the batching proxy 324 may be implemented in an equivalent manner to transmit or update record data at the data source 304. For example, when the GUI display 108, 308 or a GUI display component 160, 162, 330, 332 is configured to collect or otherwise receive input data from the user of the mobile device 110 for updating a data record 146, the native application 106, 306 and/or the application extension 124, 310 may provide a corresponding request to the cross-platform service 102, 302 to create or otherwise initiate one or more loaders 322 for storing or uploading the user input data to the data source 304. In response to receiving a query to upload user input data to the database system 104, a loader 322 at the cross-platform service 102, 302 may transform the query into a corresponding query statement in a format supported by the local cache 118 (e.g., SQL) to store the user input data for the corresponding fields of record data 128 in the cache 118 (e.g., by overwriting previous field values or null values with user input values), as well as transforming the query into a corresponding query statement in a different format supported by the database system 104 (e.g., SOQL) to upload the user input data to the appropriate data record(s) 146 at the database system 104. The upload requests from the loaders 322 may be similarly batched at the batching proxy 324 (e.g., by batching other upload requests together with one another) before being provided to the database system 104 as a batched request that includes multiple constituent upload requests to update the data records 146 at the database system 104.

Still referring to FIG. 3, with continued reference to FIGS. 1-2, exemplary implementations of the cross-platform service 102, 302 also include a data change manager 326 configurable to monitor a data source 304 for changes to one or more fields of record data that were previously associated with a request from a loader 322 and push or otherwise provide indicia of the data change to the respective loader 322. For example, in a loader 322 may configure the data change manager 326 to support a data change listener that listens or otherwise monitors for changes to particular fields of record data configured by the loader 322, and in response to a change, pushes the changed values for those fields of record data to the loader 322.

In implementations where the data service 200 is not utilized (e.g., non-LDS mode), when the native application 106, 306 and/or the application extension 124, 310 creates, calls or otherwise invokes a loader 322 to be configured with a data change listener, the respective loader 322 registers its data change listener with the data change manager 326 and configures the data change manager 326 to track the desired fields of record data 128 to be associated with the data change listener. Thereafter, the data change manager 326 monitors cache operations at the cache 118 (which may be initiated by other loaders 322 on behalf of the native application 106, 306 and/or the application extension 124, 310) for changes to the subscribed fields of record data 128 associated with the respective data change listener. When the data change manager 326 identifies a change to a subscribed field of the record data 128 in the cache 118, the data change manager 326 provides corresponding indicia of the data change to the data change listener associated with the subscribed loader 322, thereby allowing the subscribed loader 322 to retrieve or otherwise obtain the changed fields of record data 128 from the cache 118 and automatically push or otherwise provide the changed fields of record data 128 to the native application 106, 306 and/or the application extension 124, 310 associated with the initial request to the subscribed loader 322. In this manner, the data change manager 326 allows the native application 106, 306 and/or the application extension 124, 310 to automatically and asynchronously update the GUI display 108, 308 or a GUI display component 160, 162, 330, 332 substantially in real-time in response to a change to the subscribed fields of record data 128 in the local cache 118.

In implementations where the application configuration metadata 126 indicates the data service 200 is enabled (e.g., LDS mode), when the native application 106, 306 and/or the application extension 124, 310 creates, calls or otherwise invokes a loader 322 to be configured with a data change listener, the data change manager 326 utilizes an API associated with the data service 200 (e.g., a Steaming API) to register or otherwise subscribe the loader 322 to a proxy component of the data service 200 that tracks data changes at the data service cache 204. Thereafter, when changes to one or more fields of data at the data service cache 204 occur that correspond to a subscription associated with a particular loader 322, the proxy component of the data service 200 provides corresponding indicia of the data change to the data change listener associated with the subscribed loader 322, thereby allowing the subscribed loader 322 to retrieve or otherwise obtain the changed fields of record data from the data service cache 204 via the data service 200.

In exemplary implementations, the data change manager 326 manages subscriptions between loaders 322 and corresponding data changes by registering data identifiers associated with the respective loader 322. In this regard, for an atomic loader 322, the data change manager 326 registers a data change listener with the data identifiers (e.g., the particular fields of the particular data record(s) to be subscribed to changes to) obtained from the JavaScript Object Notation (JSON) response that was retrieved or otherwise obtained by the loader 322 from the data source 304. For a composite loader 322, the data change manager 326 aggregates data identifiers from each of its child loaders 322 and then registers a single data change listener associated with the composite loader 322 with the aggregated data identifiers collected from the child loaders 322. In the LDS mode, when a composite loader 322 and a child atomic loader 322 are both subscribed to data changes at the data service 200, the parent-child relationship between loaders 322 is utilized to provide indication of a data change to the data change listener associated with the composite loader 322 when notification of a data change is provided to its child loader 322.

In exemplary implementations, the cross-platform service 102, 302 also includes a location monitoring component 328 that is configurable to interface with a location service 314 at the mobile device 110 to monitor the location of the mobile device 110 in relation to one or more update criteria associated with the configuration of the native application 106, 306 to automatically initiate one or more actions at the database system 104 when an update criterion is satisfied. In practice, the location service 314 may be realized as a software module or other component of the operating system at the mobile device 110 that includes or otherwise supports one or more APIs that enable the cross-platform service 102, 302 to retrieve data or other information indicative of the location of the mobile device 110 from the location service 314. The application configuration metadata 148 downloaded from the database system 104 to the cache 118 (e.g., metadata 126) upon initialization of the native application 106, 306 includes automatic update criteria metadata 318 for the configuration associated with the instance of the native application 106, 306 to be applied to the location of the mobile device 110. In this regard, the update criteria metadata 318 define particular rules, logic or combination of location and record data field values that control or otherwise dictate when a particular action or other update should be initiated based on the current location of the mobile device 110 indicated by the location service 314 in relation to one or more fields of record data 128 maintained in the cache 118. For example, the update criteria metadata 318 may define a particular action to be automatically initiated when the current location of the mobile device 110 matches the value for a location field of a particular data record 146 maintained in the record data 128 of the local cache 118.

The location monitoring component 328 utilizes the update criteria metadata 318 and the relevant fields of cached record data 128 to detect or otherwise identify when the location service 314 provides indicia of a location of the mobile device 110 that satisfies an update criterion, and in response, the location monitoring component 328 automatically provides indication that the update criterion has been satisfied to the database system 104 over the network 130, for example, by providing a corresponding command or request to an API 144 at the application server 132 to automatically initiate a particular action at the database system 104 in accordance with the configuration associated with the instance of the native application. In this regard, the cross-platform service 102, 302 may automatically trigger the application server 132 automatically updating one or more other data records 146 at the database system 104, automatically generating one or more reports, automatically initiating execution of one or more workflows or processes and/or the like in response to a change to the location of the mobile device 110. Moreover, in an LDS mode, when the automated server-side actions triggered by the change to the location of the mobile device 110 result in changes to data fields of data records 146 that one of the loaders 322 is subscribed to, the data service 200 may automatically propagate those changes back to the data service cache 204 and the subscribed loader(s) 322, thereby automatically and asynchronously updating a GUI display 108, 308 and/or a GUI display component 160, 162, 330, 332 provided by the native application 106, 306 and/or the application extension 124, 310 to reflect the more up-to-date data at the database system 104 by leveraging the cross-platform service 102, 302 and the server-side application configuration metadata 148 without requiring a developer or designer to provide the desired automatic update support in the underlying code 122, 124.

It should be noted that although the subject matter is described herein in the context of monitoring the location of the mobile device 110 using the client-side location service 314 at the mobile device 110 to automatically trigger server-side actions or updates at the database system 104 from the client-side, the subject matter described herein is not limited to geographic location and may be implemented in an equivalent manner with respect to any other sort of data or information indicative of the environment or operating context associated with the mobile device 110. For example, the update criteria metadata 318 may include an update criterion associated with a particular network address on the network 130 or another variable or parameter indicative of the current operating context associated with the mobile device 110, such that when the current network address or other operating context associated with the mobile device 110 satisfies an update criterion associated with the current configuration of the native application 106, 306, the cross-platform service 102, 302 automatically provides corresponding indicia to the database system 104 to automatically initiate server-side action(s) by the application server 132 at the database system 104 in accordance with the application configuration metadata 148 associated with the instance of the native application 106, 306. In this regard, the application configuration metadata 148 may be configurable to support any number of different potential types or combinations of server-side actions to be automatically initiated from the client side by the cross-platform service 102, 302 at the mobile device 110 based on the operating context detected or identified by the cross-platform service 102, 302 at the mobile device 110. Accordingly, the subject matter described herein is not intended to be limited to any particular type of operating context or update criterion to be monitored by the cross-platform service 102, 302 at the client side and/or any particular type or number of server-side action(s) to be automatically initiated at the server side based on the current contextual state (or changes thereto) at the client side.

FIG. 4 depicts an exemplary application configuration process 400 suitable for implementation by a database system (e.g., database system 104) to support customization of the GUI displays associated with a native application (e.g., native application 106, 306) and perform additional tasks, functions, and/or operations described herein. For illustrative purposes, the following description may refer to elements mentioned above in connection with FIGS. 1-3. It should be appreciated that the application configuration process 400 may include any number of additional or alternative tasks, the tasks need not be performed in the illustrated order and/or the tasks may be performed concurrently, and/or the application configuration process 400 may be incorporated into a more comprehensive procedure or process having additional functionality not described in detail herein. Moreover, one or more of the tasks shown and described in the context of FIG. 4 could be omitted from a practical implementation of the application configuration process 400 as long as the intended overall functionality remains intact.

Referring to FIG. 4 with continued reference to FIGS. 1-3, in exemplary implementations, the GUI displays 108, 308 to be generated by instances of the native application 106, 306 have configurable layouts and GUI elements or other graphics contained therein that are configurable by an administrator defining application configuration metadata 148 at the database system 104. For example, in exemplary implementations, the virtual application 142 is capable of generating one or more GUI displays within a client application 152 at a client device 150 associated with an administrator user for a particular resource owner that support visual, WYSIWYG, drag and drop, declarative and/or low code (or no code) configuration of the GUI displays 108, 308 to be supported by the native application 106, 306, for example, by providing an editing region where a user may drag and drop instances of GUI display components, including, but not limited to GUI elements, web components, action components, display components, functional components, group components, input components, script components and/or the like that the user would like to incorporate into a particular GUI display 108, 308. In this regard, the administrator user may input or otherwise define values for various fields to be associated with a particular layout or GUI display component, for example, by providing one or more uniform resource locator (URL) addresses or other network locations for a data source (e.g., a data record 146 in the database 134 at the database system 104 or another remote data source on the network 130) from which data is to be retrieved at run-time to generate, render or otherwise implement the respective component in a manner that may vary dynamically based on the current state of the data at the data source. In various implementations, the configured GUI display components may include web components that correspond to server-side actions and/or client-side actions, such as, for example, invoking Apex code, invoking a REST API call, invoking a SOAP API call, setting values in a data JSON associated with a GUI display. Some example WYSI-WYG drag-and-drop GUI displays are described in U.S. Pat. No. 11,321,422.

In one or more implementations, the virtual application 142 provides a page layout editor GUI display that includes a WYSIWYG tool for customizing page layouts to control the layout and organization of buttons, fields, links, fields and other GUI display components on object record pages corresponding to particular database object types associated with the data records 146. For example, for a service appointment database object type to be incorporated in a field service native application 106, 306, an administrator user may define what fields of the resource owner's data records 146 having the service appointment database object type are visible, read only and/or required for the service appointment GUI display 108, 308 to be generated by the field service native application 106, 306 for users associated with that resource owner when those users attempt to utilize the field service native application 106, 306 to view, access or otherwise interact with a data record 146 corresponding to a service appointment database object.

Referring to FIG. 4, the application configuration process 400 analyzes the field usage by a resource owner with respect to a set of data fields associated with a particular database object type of interest for which GUI display is to be configured and identifies or otherwise determines which data fields are recommended for inclusion in the layout of the GUI display for that particular database object type based on the field usage across the different data records associated with that resource owner (tasks 402, 404). For example, in a field service example, the virtual application 142 or another component of the application platform 140 (e.g., an artificial intelligence analytics component) tracks interactions with the data records 146 associated with the resource owner and analyzes the different data records 146 associated with the resource owner having the service appointment database object type to determine which data fields of those services appointment data records 146 are most frequently utilized or interacted with by users associated with the particular resource owner. In this manner, the application platform 140 and/or the virtual application 142 may determine field usage metrics that are specific to a particular resource owner for the various different data fields for different data records 146 associated with that resource owner. Based on the field usage metrics in relation to one or more recommendation thresholds, the application platform 140 and/or the virtual application 142 may identify or otherwise determine recommended data fields for different database object types and/or different GUI displays 108, 308 associated with a native application 106, 306.

The application configuration process 400 continues by generating or otherwise providing a GUI display for configuring a GUI display native application that includes indicia of the recommended data fields for inclusion or incorporation into that native application GUI display (task 406). As described above, the application platform 140 and/or the virtual application 142 may generate or otherwise provide a WYSIWYG page layout editor GUI display within the client application 152 at the client device 150 that allows an administrator user to configure the layout of a GUI display 108, 308 to be associated with a particular database object type, for example, by defining a region 160, 330 for a service appointment GUI display 108, 308 to be populated using record data from a corresponding service appointment data record 146 in the database 134 and dragging and dropping different data fields associated with the service appointment database object to that configurable region 160, 330 of the service appointment GUI display 108, 308. In this regard, when the administrator utilizes the page layout editor GUI display to define the application configuration metadata 148 for the service appointment GUI display 108, 308, the application platform 140 and/or the virtual application 142 may graphically highlight or otherwise provide indicia of the subset of data fields associated with the service appointment database object that are recommended for inclusion within the region 160, 330 of the service appointment GUI display 108, 308 based on historical usage or interaction with the resource owner's service appointment data records 146 by field service technicians or other users associated with the resource owner.

The application configuration process 400 receives or otherwise obtains indicia of the selected data fields for inclusion or incorporation into a respective GUI display of the native application and stores or otherwise maintains the field selections in association with that particular GUI display as application configuration metadata at the database system (tasks 408, 410). For example, after a user utilizes the page editor GUI display to populate the region 160, 330 of the service appointment GUI display 108, 308 with the desired subset of data fields associated with the data records 146 having the service appointment database object type, the user may select a button or similar GUI element to store or otherwise maintain the configuration of the service appointment GUI display 108, 308 at the database system 104. In response, the application platform 140 and/or the virtual application 142 may create or otherwise update the application configuration metadata 148 associated with the resource owner for the service appointment GUI display 108, 308 of the native application 106, 306 to include indicia of the user-configured layout for the service appointment GUI display 108, 308, which includes indicia of the size, shape and/or on-screen location of the region 160, 330, along with indicia of the selected subset of data fields of the resource owner's service appointment data records 146 to be incorporated into the region 160, 330 of the service appointment GUI display 108, 308 and the corresponding layout of those selected data fields with respect to one another or other configurable GUI display components of the service appointment GUI display 108, 308.

As described in greater detail below, the page layout editor GUI display provided by the virtual application 142 at the application platform 140 may also support an administrator user modifying or otherwise configuring the layout of a GUI display to include or otherwise incorporate a custom region 162, 332 corresponding to an application extension database object or other custom GUI display component to be integrated into a GUI display 108, 308 supported by the native application 106, 306. In this regard, the custom application extension region 162, 332 may be configurable to include one or more customizable web components that correspond to server-side actions and/or client-side actions that may be triggered automatically (e.g., when the GUI display 108, 308 is initially loaded or generated) or initiated in response to user interaction with the region 162, 332 of the GUI display 108, 308. The configured code or other metadata configured by the resource owner to support the application extension region 162, 332 may be stored or otherwise maintained in a data record 146 having an application extension database object type, with the application configuration metadata 148 being configured to identify, invoke or otherwise refer to the appropriate application extension data record 146 to cause the cross-platform service 102, 302 to download or otherwise retrieve the corresponding application extension code 124 configured to support the application extension region 162, 332, as described in greater detail below.

Still referring to FIG. 4, in exemplary implementations, the application configuration process 400 analyzes the application configuration metadata associated with a particular resource owner to identify data fields of the different data records associated with the resource owner to be utilized for priming the native application and maintains identification of the data fields at the database system (tasks 412, 414). In this regard, the application platform 140 and/or the virtual application 142 analyzes the application configuration metadata 148 associated with the resource owner for the various GUI displays 108, 308 associated with the native application 106, 306 to identify which data fields of different types of data records 146 have been selected or otherwise configured for inclusion or incorporation in one or more of the GUI displays 108, 308. Thus, for each database object type supported by the native application 106, 306, the application platform 140 and/or the virtual application 142 may identify a subset of data fields for that particular database object type that are utilized for purposes of generating at least one of the GUI displays 108, 308, for example, by a respective data field being added to a layout of a GUI display 108, 308 or a respective data field being utilized to generate or otherwise populate a GUI element or other GUI display component of a GUI display 108, 308. On the other hand, for each database object type supported by the native application 106, 306, the application platform 140 and/or the virtual application 142 may exclude from inclusion in the subset of data fields for priming, any data fields for a particular database object type that are not included in the application configuration metadata 148 and/or are not utilized to generate or otherwise populate a GUI display 108, 308.

The application platform 140 and/or the virtual application 142 stores or otherwise maintains the identified subsets of data fields for priming in the database 134 at the database system 104 (e.g., as part of the application configuration metadata 148 for a particular resource owner). For example, for a service appointment database object type, the application platform 140 and/or the virtual application 142 may analyze the configured layouts for the different GUI displays 108, 308 supported by the field service native application 106, 306 associated with a particular resource owner to identify the subset of data fields associated with the service appointment database object type that are configured for use by that particular resource owner and maintain, in association with that particular resource owner, identification of the utilized subset of data fields associated with the service appointment database object type for priming. In this regard, the identified subset of data fields associated with the service appointment database object type for priming excludes the data fields associated with the service appointment database object type that are not utilized in the configured layouts for the different GUI displays 108, 308 for that particular resource owner.

Figure 5:
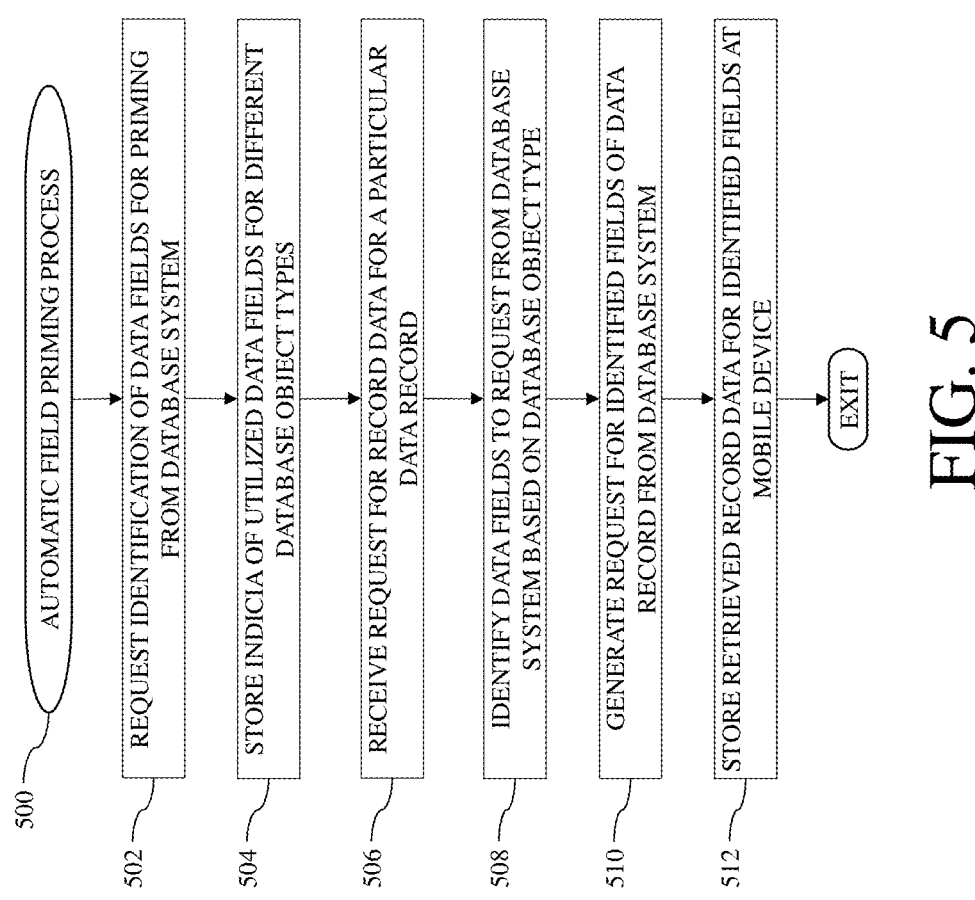
FIG. 5 is a flow diagram illustrating an automatic field priming process suitable for implementation in connection with the application configuration process of FIG. 4 according to some example implementations.

FIG. 5 depicts an exemplary automatic field priming process 500 suitable for implementation by a cross-platform service (e.g., cross-platform service 102, 302) at a mobile device (e.g., mobile device 110) to selectively download only those data fields utilized by the GUI displays associated with a native application configured in accordance with the application configuration process 400 of FIG. 4 and perform additional tasks, functions, and/or operations described herein. For illustrative purposes, the following description may refer to elements mentioned above in connection with FIGS. 1-3. It should be appreciated that the automatic field priming process 500 may include any number of additional or alternative tasks, the tasks need not be performed in the illustrated order and/or the tasks may be performed concurrently, and/or the automatic field priming process 500 may be incorporated into a more comprehensive procedure or process having additional functionality not described in detail herein. Moreover, one or more of the tasks shown and described in the context of FIG. 5 could be omitted from a practical implementation of the automatic field priming process 500 as long as the intended overall functionality remains intact.

Referring to FIG. 5, with continued reference to FIGS. 1-4, in exemplary implementations, the automatic field priming process 500 is initiated by the cross-platform service 102, 302 at the mobile device 110 in response to receiving an indication from the native application 106, 306 to initialize data synchronization between the database system 104 and the cache 118, 204 at the mobile device 110. The automatic field priming process 500 initializes or otherwise begins by the cross-platform service requesting identification of the data fields of the different data records associated with the resource owner to be utilized for priming the native application from the database system and storing or otherwise maintaining indicia of the identified data fields at the mobile device in association with the different database object types (tasks 502, 504). For example, when the native application 106, 306 launches or otherwise initiates execution at the mobile device 110, the native application 106, 306 may provide a command, signal or other instruction to invoke the field priming component 320 of the cross-platform service 102, 302 transmitting or otherwise providing a request for identification of the record data fields to be utilized for priming the native application 106, 306 from the database system 104.

In response to invocation by the native application 106, 306, the field priming component 320 of the cross-platform service 102, 302 generates a corresponding request for the identification of the priming data fields from the database system 104 and transmits or otherwise provides the request to the database system 104 over the network 130. In this regard, the request for identification of the priming data fields includes identification of the resource owner associated with the instance of the native application 106, 306 (e.g., the identification of the tenant or organization associated with the user of the mobile device 110). The application platform 140 at the database system 104 responds to the request by providing identified subsets of data fields for priming to the cross-platform service 102, 302 over the network 130. The field priming component 320 updates the metadata 126 at the local cache 118 to store or otherwise maintain identification of the subsets of data fields for priming in association with the different database object types supported by the native application 106, 306.

The automatic field priming process 500 continues by receiving a request for record data for a particular data record and identifying the subset of data fields to request for that particular data record based on the database object type associated with the data record (tasks 506, 508). In this regard, when the native application 106, 306 and/or the application extension 124, 310 transmits or otherwise provides a request for a data record of a particular type of database object for generating a particular GUI display 108, 308 to the cross-platform service 102, 302, the cross-platform service 102, 302 utilizes the subset of data fields for priming associated with the database object type to configure one or more loaders 322 to retrieve the current values for that subset of data fields of the requested data record 146 from the database system 104. For example, when the native application 106, 306 and/or the application extension 124, 310 requests record data for a particular service appointment data record 146, the cross-platform service 102, 302 may utilize the identified subset of data fields for priming that are associated with the service appointment database object and maintained as metadata 126 in the local cache 118 to generate a corresponding configuration of loaders 322 to download or otherwise obtain those identified data fields of the particular service appointment data record 146 from the database 134 at the database system 104. In one implementation, the cross-platform service 102, 302 may support a parent composite loader 322 to be associated with the configured service appointment GUI display 108, 308 or the service appointment data record requested, with child atomic loaders 322 to be associated with downloading the individual data fields of the requested service appointment data record 146 corresponding to the subset of priming data fields associated with the service appointment database object type for that resource owner.

Still referring to FIG. 5, the automatic field priming process 500 stores or otherwise maintains the retrieved record data for the identified subset of data fields for priming at the mobile device (task 512), thereby synchronizing the record data in the cache at the mobile device with the record data at the database system. In a non-LDS mode, the cross-platform service 102, 302 requests values for the priming data fields from the application server 132 at the database system 104 (e.g., via one or more APIs 144), which executes the queries provided by the cross-platform service 102, 302 and provides the responsive record data back to the cross-platform service 102, 302 over the network 130. The cross-platform service 102, 302 then stores the retrieved field values as record data 128 in the local cache 118. In the LDS mode, the cross-platform service 102, 302 requests values for the priming data fields from the data service 200, which, in turn obtains the requested values from the database system 104 over the network 130, stores or maintains the requested record data in its associated cache 204, and then response to the cross-platform service 102, 302 with the downloaded values for the requested data fields of the data record 146.

By virtue of the requests from the cross-platform service 102, 302 including only those data fields of the data records 146 that are likely to be utilized by the native application 106, 306 and/or the application extension 124, 310, the database system 104 may respond with the requested record data more quickly, and the amount of bandwidth utilized on the network 130 for requesting and retrieving the record data may be reduced, thereby allowing the cross-platform service 102, 302 to more efficiently synchronize the desired record data 128 at the client-side cache 118, 204 with the database 134 and reduce the amount of time required to respond to the native application 106, 306 to generate the configured GUI display 108, 308. Moreover, by priming the native application 106, 306 by downloading all of the data fields of a particular data record 146 that are likely to be utilized by the various GUI displays 108, 308 of the native application 106,

306, the automatic field priming process 500 supports offline operation when the mobile device 110 loses connectivity to the network 130 by allowing the GUI displays 108, 308 of the native application 106, 306 to be generated and rendered using the primed data fields from the record data 128 in the local cache 118 (or the data service cache 204 when offline in the LDS mode) without having to make additional requests to the database system 104.

FIG. 6 depicts an exemplary data synchronization process 600 suitable for implementation by a cross-platform service (e.g., cross-platform service 102, 302) at a mobile device (e.g., mobile device 110) to synchronize the GUI displays associated with a native application with record data maintained in a cache at the mobile device and perform additional tasks, functions, and/or operations described herein. For illustrative purposes, the following description may refer to elements mentioned above in connection with FIGS. 1-5. It should be appreciated that the data synchronization process 600 may include any number of additional or alternative tasks, the tasks need not be performed in the illustrated order and/or the tasks may be performed concurrently, and/or the data synchronization process 600 may be incorporated into a more comprehensive procedure or process having additional functionality not described in detail herein. Moreover, one or more of the tasks shown and described in the context of FIG. 6 could be omitted from a practical implementation of the data synchronization process 600 as long as the intended overall functionality remains intact.

Referring to FIG. 6 with continued reference to FIGS. 1-5, in one or more implementations, the data synchronization process 600 is implemented or otherwise performed in connection with the automatic field priming process 500 of FIG. 5 after downloading the field priming metadata 126 to the local cache 118 to subsequently download or otherwise retrieve record data 128 from the database system 104 to a cache 118, 204 at the mobile device 110. For example, as described above, in response to request from the native application 106, 306 to retrieve the record data for a service appointment data record 146 at the database system 104, the cross-platform service 102, 302 may utilize the field priming metadata 126 associated with the service appointment database object to query the database system 104 (either directly in a non-LDS mode or indirectly via the data service 200 in an LDS mode depending on the application configuration metadata 126, 148) and download values for the identified priming subset of data fields of the service appointment data record 146 to a cache 118, 204 at the mobile device 110 as record data 128. Thereafter, the native application 106, 306 may generate the service appointment GUI display 108, 308 having GUI display components or regions 160, 162, 330, 332 populated using the cached values for the data fields of the service appointment data record 146. In this regard, the data synchronization process 600 may be utilized to subscribe the loaders 322 associated with the service appointment GUI display 108, 308 or a component 160, 162, 330, 332 contained therein to the data fields of the service appointment data record 146 such that changes to the values for one or more data fields of the service appointment data record 146 in a cache 118, 204 at the mobile device 110 are pushed or otherwise propagated to the service appointment GUI display 108, 308 substantially in real-time.

Referring to FIG. 6, the illustrated data synchronization process 600 begins with the cross-platform service receiving a request for record data from the native application at the client device, identifying what data source to request the record data from based on the application configuration metadata associated with the native application and retrieving the record data from the identified data source (tasks 602, 604, 606). For example, when a user interacts with the native application 106, 306 to cause a GUI display 108, 308 including an application extension GUI display component 162, 332 to be presented at the mobile device 110, the application extension 124, 310 may generate a request including identification information for a particular data record 146 at the database system 104 to be utilized for generating the application extension GUI display component 162, 332. The native application 106, 306 provides the request to the cross-platform service 102, 302, for example, by commanding, instructing or otherwise configuring a parent composite loader 322 to be associated with the GUI display 108, 308 to be generated with one or more child atomic loaders 322 to be associated with retrieving the record data for the identified data record 146. In this regard, child atomic loaders 322 for retrieving record data for the identified data record 146 may be created for each of the priming data fields associated with the database object type assigned to the identified data record 146 using the field priming metadata 126, as described above. Thereafter, based on the application configuration metadata 126, 148, the child atomic loaders 322 are configured to generate queries for the respective data fields of the data record 146 from either the database system 104 (e.g., via an API 144 at the application server 132) in a non-LDS configuration or the data service 200 in an LDS configuration, and then provide the generated queries to the identified data source 104, 200 to thereby download the requested data fields of the data record 146 to a cache 118, 204 at the mobile device 110. The callback listeners associated with the child atomic loaders 322 receive the current values retrieved for the requested data fields of the identified data record 146 and provide the retrieved values back to the native application 106, 306 (e.g., via a parent composite loader 322 associated with the GUI display 108, 308), which, in turn, provides the retrieved values for the identified data record 146 to the application extension 124, 310 for generating the GUI display component 162, 332.

Still referring to FIG. 6, the data synchronization process 600 configures one or more data change listeners to subscribe to the respective data fields of retrieved record data in the cache at the mobile device to automatically provide or otherwise push updated values for one or more of the respective data fields of retrieved record data to the native application in response to changes to the respective values in the cache (tasks 608, 610). For example, as described above, in a non-LDS configuration of the native application 106, 306, the child atomic loaders 322 for retrieving data fields for the application extension component 162, 332 may register their respective data change listener with the data change manager 326 and configures the data change manager 326 to track the desired fields of record data 128 in the local cache 118. Thereafter, the data change manager 326 monitors cache operations at the cache 118 for changes to the subscribed fields of record data 128 associated with the respective data change listener. In this regard, user interaction with another component 160, 330 of the GUI display 108, 308 to input or modify the value for the data field of a record may cause the native application 106, 306 to initiate a loader 322 to update the value for that data field of the record data 128 in the local cache 118 to the user input value before providing the user input value to the database system 104 for updating the corresponding data record 146 in the database 134. As another example, user interaction with another component 160, 330 of the GUI display 108, 308 to refresh or update the component 160, 330 may cause the native application 106, 306 to initiate a loader 322 to download updated values for data fields of the corresponding data record 146 from the database 134 and update the corresponding fields of record data 128 in the local cache 118 to reflect the more updated values.

When the data change manager 326 identifies a change to a subscribed field of the record data 128 in the cache 118, the data change manager 326 provides corresponding indicia of the data change to the data change listener associated with the subscribed loader 322, thereby allowing the subscribed loader 322 to retrieve or otherwise obtain the changed fields of record data 128 from the cache 118 and automatically push or otherwise provide the changed fields of record data 128 in the cache 118 back to application extension 124, 310 (e.g., via the composite loader 322 associated with the GUI display 108, 308 of the native application 106, 306). The application extension 124, 310 may dynamically update the application extension GUI display component 162, 332 automatically in response to the indicia of the data change from the cross-platform service 102, 302 (via the native application 106, 306) to automatically and asynchronously update the application extension GUI display component 162, 332 substantially in real-time.

When the native application 106, 306 is configured for an LDS mode, the data change manager 326 utilizes an API associated with the data service 200 to register or otherwise subscribe the loader 322 to a proxy component of the data service 200 that tracks data changes at the data service cache 204. Thereafter, when changes to one or more fields of data at the data service cache 204 occur that correspond to a subscription associated with a particular loader 322, the proxy component of the data service 200 provides corresponding indicia of the data change to the data change listener associated with the subscribed loader 322, thereby allowing the subscribed loader 322 to retrieve or otherwise obtain the changed fields of record data from the data service cache 204 via the data service 200. For example, in some implementations, the data service 200 may be subscribed to or otherwise listen for events at the database system 104 (e.g., via the application platform 140 or one or more APIs 144 associated therewith) pertaining to particular data records 146 associated with the resource owner and/or the user of the mobile device 110, such that the data service 200 may be automatically notified of changes to corresponding data records 146 at the database 134 (e.g., by the application platform 140 pushing a notification of a data change event to the data service 200 over the network 130). In response to receiving indication of a data change event at the database system 104, the data service 200 may automatically download or retrieve the updated values for data fields of the data records 146 of interest from the database system 104 to the data service cache 204, thereby synchronizing the data service cache 204 with the data records 146 at the database system 104. Thereafter, in response to identifying a change to a data field of record data 128 in the data service cache 204 for which a loader 322 is subscribed via the data change manager 326, an API associated with the data service 200 may automatically provide indication of the data change to the subscribed loader 322 and/or the data change manager 326, thereby allowing the subscribed loader 322 to retrieve or otherwise obtain the changed fields of record data 128 from the data service cache 204 (e.g., via the data service 200) and automatically push or otherwise provide the changed fields of record data 128 in the cache 118 back to the application extension 124, 310 in a similar manner as the non-LDS mode. In this regard, by virtue of the data synchronization process 600 supported by the cross-platform service 102, 302, the manner in which the native application 106, 306 and/or the application extension 124, 310 receives updated data to synchronize the GUI display 108, 308 may be invariant with respect to whether or not the native application 106, 306 is configured for LDS or non-LDS operation.

Figure 7:
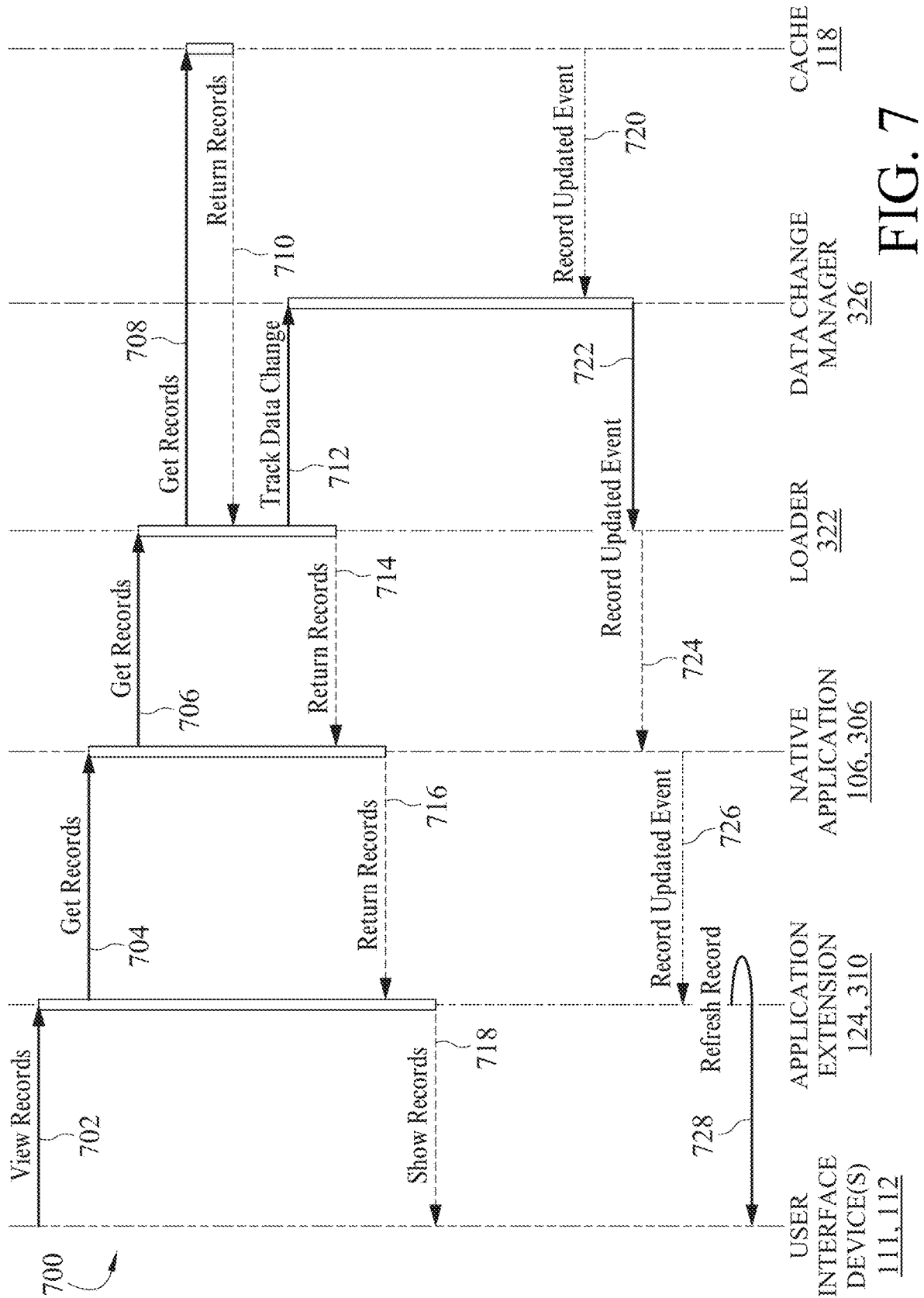
FIGS. 7-8 are timing diagrams depicting sequences of communications within a computing system of FIGS. 1-3 in connection with the data synchronization process of FIG. 6 according to some example implementations.

FIG. 7 depicts a sequence 700 of communications between elements of a computing system 100, 300 in connection with exemplary implementation of the data synchronization process 600 of FIG. 6 in a non-LDS configuration of the native application 106, 306. The depicted sequence 700 begins by a user of the mobile device 110 interacting with a user interface (e.g., user input device 111) associated with the mobile device 110 to generate a request 702 to view a particular data record of interest via a GUI display component 162, 332 associated with the application extension 124, 310. In response, the application extension 124, 310 provides a corresponding request 704 to the native application 106, 306 that includes identification information for the data record 146 of interest or other input information from the user associated with the originating request 702. The native application 106, 306 provides a corresponding request 706 to the cross-platform service 102, 302 to create one or more loaders 322 configured to retrieve values for the data fields of the requested data record(s) 146 from the local cache 118. In this regard, FIG. 7 may correspond to a scenario where the current configuration of the native application 106, 306 is in an offline mode (e.g., due to unavailability of the network 130) or an online mode where values for the data fields of the requested data record(s) 146 have already been downloaded to the local cache 118 (e.g., by the native application 106, 306 upon initialization of in connection with the automatic field priming process 500). The loaders 322 transform the request 706 from the native application 106, 306 into a transformed request having the appropriate query format or otherwise in the appropriate language for retrieving the record data values from the local cache 118 and provides the transformed request 708 to the local cache 118, which, in turn provides a corresponding response 710 to the loaders 322 that include the cached values for the requested data fields from the record data 128. The loaders 322 are configured to provide 714 the retrieved cached values for the requested fields of the identified data record 146 in response to the request 706 from the native application 106, 306, which, in turn, causes the native application 106, 306 to provide 716 the retrieved values back to the application extension 124, 310. The application extension 124, 310 then executes or otherwise utilizes the retrieved values 716 to generate 718 a corresponding GUI display component 162, 332 that is provided to the user of the mobile device 110 via GUI display 108, 308 rendered on the display device 112.

In the implementation depicted in FIG. 7, the initiating request 704 from the application extension 124, 310 is configured to include data, information or other instructions indicative of a desire for the application extension 124, 310 to be subscribed to one or more of the requested data fields, which, in turn, causes one or more of the loaders 322 to register with the data change manager 326 to configure the data change manager 326 to monitor the subscribed fields of record data 128 in the local cache 118 for any data change events. In this regard, in response to a change or modification to the cached value in the record data 128 for one or more subscribed data fields of the requested data record 146 (e.g., due to the user modifying a value for one or more fields of the record via component 160, 330 of the GUI display 108, 308), the data change manager 326 detects or otherwise identifies 720 the data change event, maps the data change event to the corresponding loaders 322 subscribed to the relevant data fields, and then provides the updated data field values 722 resulting from the data change event back to the subscribed loaders 322 via the data change listeners associated with the respective loaders 322. The loaders 322 then push or otherwise provide 724 the updated data field values back to the native application 106, 306, which, in turn, causes the native application 106, 306 to push or otherwise provide 726 the updated values back to the application extension 124, 310. In response to the updated values, the application extension 124, 310 may automatically refresh or otherwise update 728 the GUI display component 162, 332 to reflect the updated values, thereby asynchronously and automatically updating the application extension GUI display component 162, 332 to maintain the application extension GUI display component 162, 332 synchronized with the record data 128 in the local cache 118.

Figure 8:
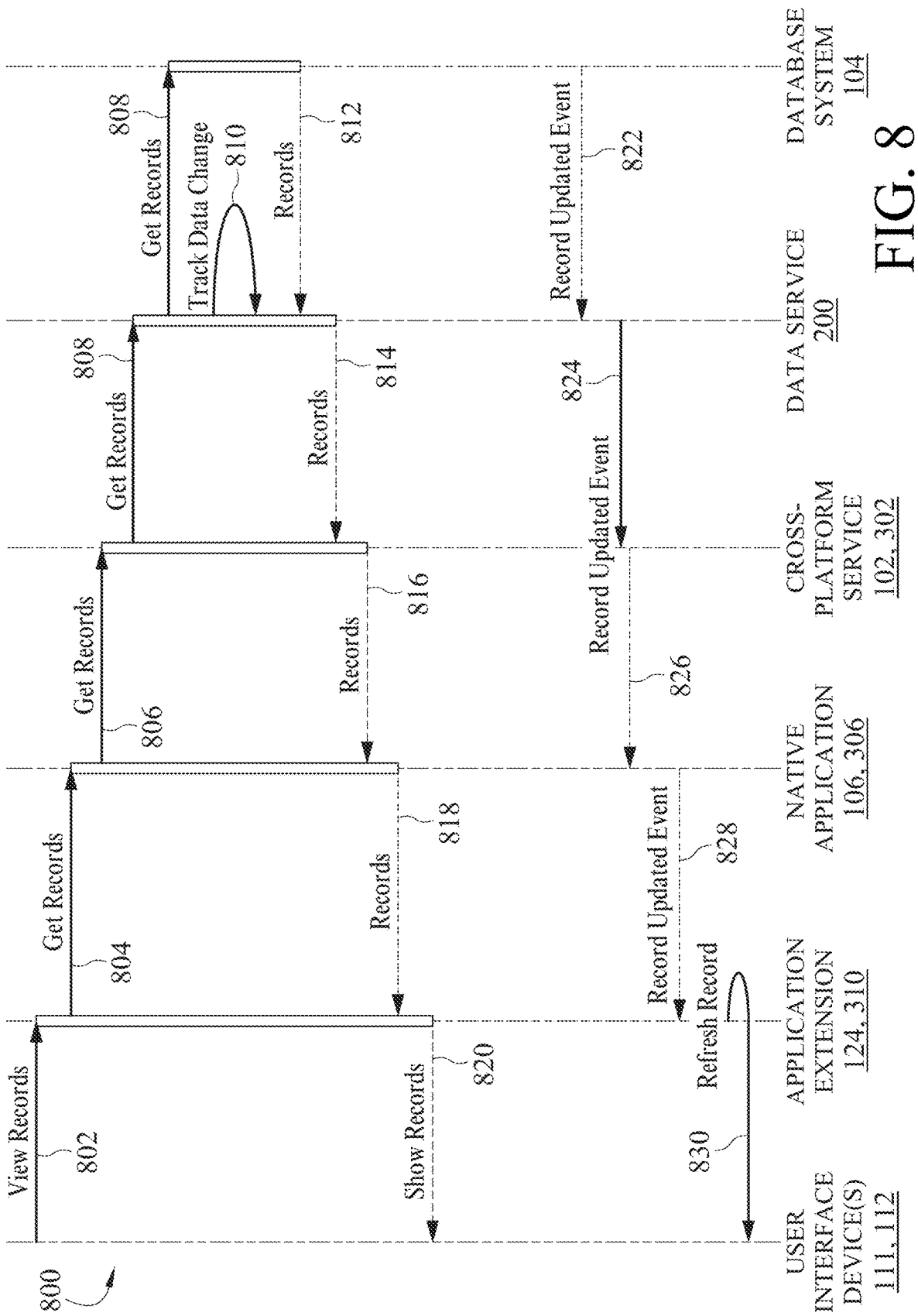

FIG. 8 depicts a sequence 800 of communications between elements of a computing system 100, 300 in connection with exemplary implementation of the data synchronization process 600 of FIG. 6 in an LDS configuration of the native application 106, 306. The depicted sequence 800 begins by a user of the mobile device 110 interacting with a user interface (e.g., user input device 111) associated with the mobile device 110 to generate a request 802 to view a particular data record of interest via a GUI display component 162, 332 associated with the application extension 124, 310. In response, the application extension 124, 310 provides a corresponding request 804 to the native application 106, 306 that includes identification information for the data record 146 of interest or other input information from the user associated with the originating request 802. The native application 106, 306 provides a corresponding request 806 to the cross-platform service 102, 302 to create one or more loaders 322 configured to retrieve values for the data fields of the requested data record(s) 146. In this regard, FIG. 8 depicts a scenario where the cross-platform service 102, 302 determines to request the record data from the data service 200 based on the configuration of the native application 106, 306 for the LDS mode and provides a corresponding request 808 to the data service 200 that includes a query for the desired fields of the record data (e.g., the priming data fields) that is formatted in a query language or format associated with the data service 200. The request 808 from the cross-platform service 102, 302 may also include one or more calls to an API associated with the data service 200 that cause the data service 200 to subscribe 810 the cross-platform service 102, 302 (or a particular loader 322 associated therewith) to data change events with respect to the requested record.

In the illustrated implementation, the data service 200 utilizes the query received from the cross-platform service 102, 302 to download or otherwise retrieve 812 the requested data fields from the desired data record 146 at the database system 104, cache the retrieved values in the data service cache 204, and provide a corresponding response 814 to the cross-platform service 102, 302 (or one or more loaders 322 associated therewith) that includes the requested fields of downloaded record data 128 currently maintained in the data service cache 204. In a similar manner as described above, the cross-platform service 102, 302 provides the responsive record data 816 to the native application 106, 306, which, in turn, provides the responsive record data 818 to the application extension 124, 310 for generating 820 an application extension GUI display component 162, 332 within a GUI display 108, 308 on the display device 112 at the mobile device 110 using the record data.

Still referring to FIG. 8, in the LDS configuration, the data service 200 may utilize to one or more services provided by an application platform 140 to subscribe the data service 200 to data change events associated with the data record 146 of interest at the database system 104. In this regard, in response to a change to the value of a data field of the data record 146 at the database system 104, the application platform 140 may automatically push or otherwise provide 822 indicia of the updated value to the data service 200 to automatically and dynamically update the record data 128 in the data service cache 204 to maintain synchronization with the data record 146 at the database system 104. In response to the data change event updating the record data 128 in the data service cache 204, the API associated with the data service 200 that maintains the subscription information associated with the cross-platform service 102, 302 automatically provides 824 indicia of the updated data field value(s) to the cross-platform service 102, 302 (or a particular loader 322 associated therewith). In a similar manner as described above in the context of the non-LDS configuration, the cross-platform service 102, 302 pushes or otherwise provides 826 the updated data field values back to the native application 106, 306, which, in turn, causes the native application 106, 306 to push or otherwise provide 828 the updated values back to the application extension 124, 310. In response to the updated values, the application extension 124, 310 may automatically refresh or otherwise update 830 the GUI display component 162, 332 to reflect the updated values, thereby asynchronously and automatically updating the application extension GUI display component 162, 332 to maintain the application extension GUI display component 162, 332 synchronized with the record data 128 in the data service cache 204. In this regard, by virtue of the data synchronization process 600 in concert with the LDS mode configuration of the native application 106, 306, application extension GUI display components 162, 332 may be automatically updated in response to server-side changes to data records 146 at the database system 104, thereby enabling server-side control of the application extension GUI display components 162, 332 and the GUI displays 108, 308 containing the same.

Figure 9:
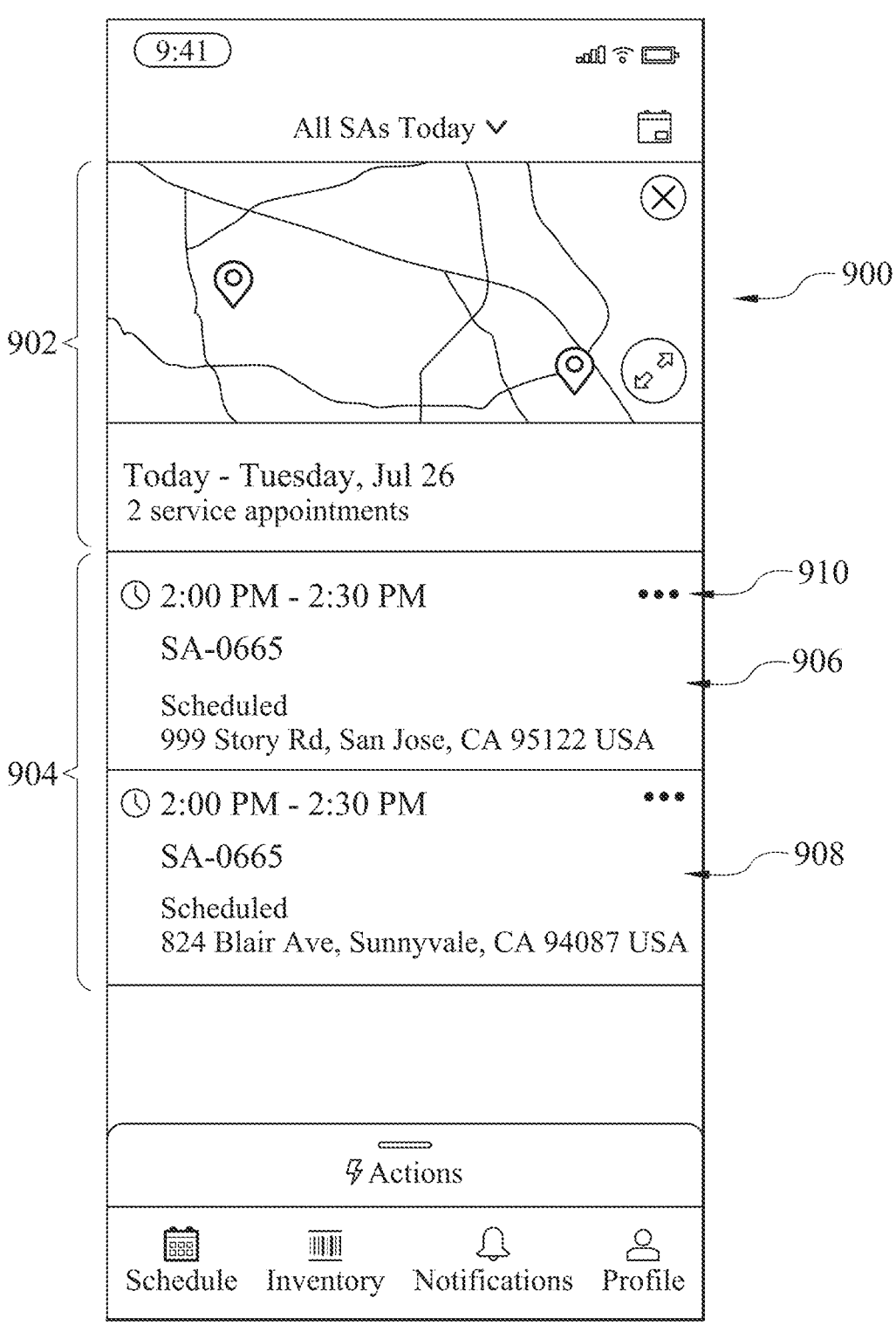
FIGS. 9-10 depict an exemplary sequence of graphical user interface (GUI) displays suitable for presentation on a mobile device in connection with the data synchronization process of FIG. 6 according to an example implementation.
Figure 10:
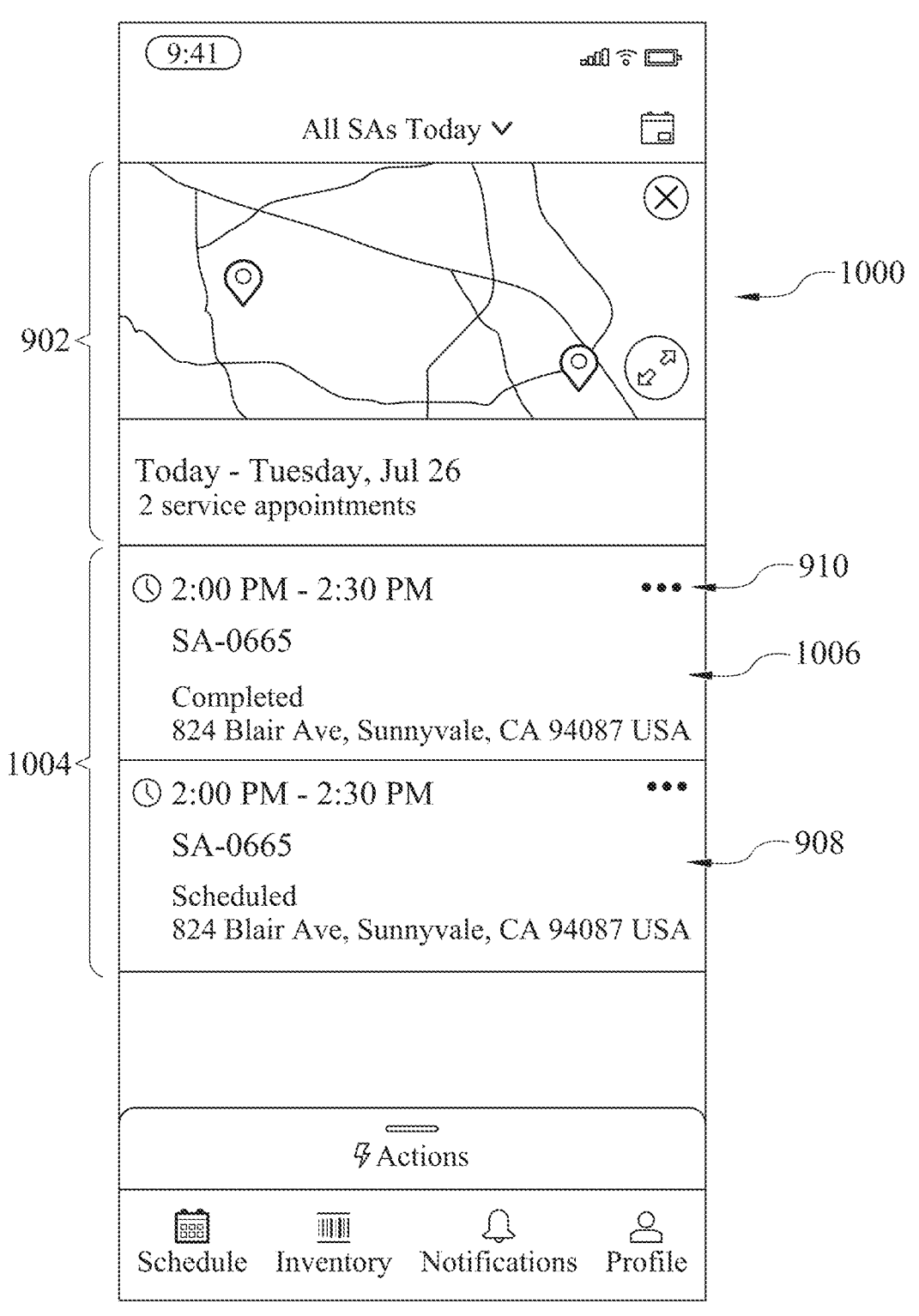

FIGS. 9-10 depict an exemplary sequence of service appointment GUI displays 900, 1000 suitable for presentation by a field service native application 106, 306 at a mobile device 110 in connection with the data synchronization process 600 of FIG. 6 in accordance with one or more implementations. Referring to FIG. 9, with continued reference to FIGS. 1-6, the initial state of the service appointment GUI display 900 represents a GUI display 108, 308 that may be generated by the native application 106, 306 upon initialization at the mobile device 110. For example, upon a user of the mobile device 110 interacting with the user input device 111 to launch or otherwise initiate the field service native application 106, 306, the cross-platform service 102, 302 may download or otherwise obtain field priming metadata 126 from the application configuration metadata 148 at the database system 104 that identifies the priming data fields for a service appointment database object to include the appointment number field for an auto-assigned number that identifies the appointment, the scheduled start field for the time at which a respective appointment is scheduled to start, the scheduled end field for the time at which a respective appointment is scheduled to end, the address field for the address where the appointment is taking place, and the status field indicating the status of the appointment.

Thereafter, to generate the initial service appointment GUI display 108, 308, 900, the native application 106, 306 may automatically provide a request, to the cross-platform service 102, 302, for service appointment data records 146 that are associated with the user of the mobile device 110 in order to populate the GUI display components 160, 330, 902, 904 associated with the configured layout of the service appointment GUI display 108, 308, 900. In this regard, the application configuration metadata 148 associated with the native application 106, 306 defines a layout for the service appointment GUI display 108, 308, 900 that includes a first region 902 to be populated with a map GUI display component 160, 330 to be populated with indicia of the locations of the user's service appointments along with a second region 904 to be populated with a list GUI display component 160, 330 to be populated with a listing of selected fields of information for the user's service appointments. Thus, the field priming metadata 126 associated with the service appointment database object type includes the data fields of the service appointment data records 146 for generating or populating the defined GUI display components 160, 330, 902, 904 of the service appointment GUI display 108, 308, 900. It should be noted that when the service appointment GUI display 108, 308, 900 is configured to include additional regions or GUI display components 162, 332 associated with an application extension 124, 310, when the native application 106, 306 invokes or otherwise initiates the embedded application extension 124, 310 in connection with generating the initial service appointment GUI display 108, 308, 900, the application extension 124, 310 may provide corresponding requests, to the native application 106, 306, for service appointment data records 146 that are associated with the user of the mobile device 110 or other data records 146, depending on the configuration of the application extension 124, 310.

To retrieve the service appointment record data 128 for populating the regions 160, 330, 902, 904 of the service appointment GUI display 108, 308, 900, the native application 106, 306 may interact with the cross-platform service 102, 302 to create corresponding loaders 322 for downloading values for the priming data fields of the service appointment data records 146 that are associated with the user. In this regard, the created loaders 322 may include individual atomic loaders 322 to download appointment number field values, the scheduled start field values, the scheduled end field values, the address field values, and the status field values for the service appointment data records 146 that are associated with the user. For example, in one implementation, the loaders 322 may be hierarchically arranged, with a parent composite loader 322 associated with the service appointment GUI display 108, 308, 900 having associated therewith a first child atomic loader 322 associated with the first region 902 of the layout to retrieve the service appointment address field values and a child composite loader 322 associated with the second region 904 of the layout, where the child composite loader 322 includes child atomic loaders 322 to retrieve appointment number field values, scheduled start field values, scheduled end field values, address field values, and the status field values. As described in above and in greater detail below, the cross-platform service 102, 302 batches and transforms the queries associated with the different loaders 322 before downloading the identified fields of record data 128 from the matching service appointment data records 146 in the database 134 that are associated with the user to a cache 118, 204 at the mobile device 110, either directly from the database system 104 or via the data service 200.

After the priming data fields of record data 128 have been downloaded to the mobile device 110, the cross-platform service 102, 302 provides the cached record data 128 back to the native application 106, 306 via the callback listeners associated with the loaders 322, thereby enabling the native application 106, 306 to populate the regions 160, 330, 902, 904 of the service appointment GUI display 108, 308, 900 generated by the native application 106, 306. As shown, the map GUI display component 902 is populated with a navigational map that includes graphical representations of the locations of the two service appointments associated with the mobile device user that reflect the retrieved addresses associated with those service appointments, while the list GUI display component 904 is populated with a listing of the two service appointments associated with the mobile device user that include graphical representations 906, 908 of the respective service appointments that include graphical representations of the cached data field values for the respective service appointment data record 146. For example, the graphical representation of a first service appointment 906 includes graphical representations of the cached values for the scheduled start field (e.g., "2:00 PM"), the scheduled end field (e.g., "2:30 PM"), the appointment number field (e.g., "SA-0665"), the status field (e.g., "Scheduled") and the address field corresponding to the downloaded values from the service appointment data record 146 associated with that respective service appointment.

Referring now to FIG. 10, in connection with the data synchronization process 600, a loader 322 associated with the list GUI display component 904 may be subscribed to the status field of the record data 128 in the cache 118, 204 to receive indicia of a data change event with respect to the value of the status field of a record. In this regard, once the first service appointment has been completed, the user of the mobile device 110 may utilize the native application 106, 306 to update or otherwise change the status of the service appointment, for example, by selecting a GUI control element 910 that allows the user to change the status from "Scheduled" to "Completed" at the end of the service appointment. In response to the user interaction, the native application 106, 306 may interact with the cross-platform service 102, 302 to cause the cross-platform service 102, 302 to update the value for the status field of the selected service appointment, for example, by creating a loader 322 configured to put or write the updated value for the status field of the selected service appointment to the database system 104. In the non-LDS configuration, the loader 322 at the cross-platform service 102, 302 updates the cached value for the status field in the record data 128 at the local cache 118 before transmitting a corresponding request to an API 144 at the database system 104 to overwrite the previous value for the status field of the identified service appointment data record 146 with the updated status value. In response to the change at the local cache 118, the data change manager 326 provides the updated status value to the data change listener associated with the loader 322 for the list GUI display component 904, thereby causing the native application 106, 306 to dynamically update the list GUI display component 904 from the initial state to an updated list GUI display component 1004 by automatically updating the graphical representation of the first service appointment 906 to provide an updated graphical representation 1006 that indicates the updated status field value of "Completed." In this manner, the data synchronization process 600 supported by the data change manager 326 at the cross-platform service 102, 302 synchronizes the GUI displays 108, 308 generated by the native application 106, 306 with the underlying record data 128 in the local cache 118.

Similarly, in the LDS configuration, the loader 322 at the cross-platform service 102, 302 provides a corresponding request to the data service 200 that causes the data service 200 to update the cached value for the status field in the record data 128 at the data services cache 204 before transmitting a corresponding request to an application platform 140 and/or an API 144 at the database system 104 to update the status field of the identified service appointment data record 146 at the database system 104. Additionally, as described above, an API associated with the data service 200 provides corresponding indication of the updated status field value back to the appropriate loader 322 at the cross-platform service 102, 302 that was subscribed to the status field in the record data 128 at the data services cache 204, thereby enabling the native application 106, 306 to dynamically generate the updated list GUI display component 1004 in a similar manner. In this manner, the data synchronization process 600 supported by the cross-platform service 102, 302 synchronizes the GUI displays 108, 308 generated by the native application 106, 306 with the underlying record data 128 in the data service cache 204, which, in turn, may be synchronized with the data records 146 at the database system 104, thereby enabling server-side initiated updates to the native application GUI displays 108, 308. For example, if a different user associated with the resource owner completed the first service appointment and updated the status field of the data record 146 from his or her mobile device 110, the change to the status field at the database system 104 may be propagated to the data service cache 204 via the data service 200 and then pushed to the native application 106, 306 via the cross-platform service 102, 302, thereby enabling client-side updates to the native application GUI displays 108, 308 responsive to server-side actions at the database system 104.

It should be noted that although FIGS. 9-10 are described in the context of GUI display components 160, 330, 902, 904 associated with the native application 106, 306, the subject matter may be implemented in an equivalent manner in the context of GUI display components 162, 332 associated with an application extension 124, 310 by using the native application 106, 306 as an intermediary between the cross-platform service 102, 302 and the application extension 124, 310. In this regard, the application extension 124, 310 may be designed or otherwise configured independent of the configuration of the native application 106, 306 (e.g., LDS or non-LDS) and independent of the data source for the record data utilized by the application extension 124, 310 to generate the application extension GUI display components 162, 332, while still allowing the application extension 124, 310 to support automatic updating and synchronization of the application extension GUI display components 162, 332 with the cached record data 128 at the mobile device 110.

FIG. 11 depicts an exemplary query transformation process 1100 suitable for implementation by a cross-platform service (e.g., cross-platform service 102, 302) at a mobile device (e.g. mobile device 110) to translate, transform or otherwise convert a query for record data received from a native application in a format that is independent or otherwise agnostic with respect to the source from which the record data is to be retrieved into a different format that is specific to or otherwise supported by that source of record data. For illustrative purposes, the following description may refer to elements mentioned above in connection with FIGS. 1-3. It should be appreciated that the query transformation process 1100 may include any number of additional or alternative tasks, the tasks need not be performed in the illustrated order and/or the tasks may be performed concurrently, and/or the query transformation process 1100 may be incorporated into a more comprehensive procedure or process having additional functionality not described in detail herein. Moreover, one or more of the tasks shown and described in the context of FIG. 11 could be omitted from a practical implementation of the query transformation process 1100 as long as the intended overall functionality remains intact.

In one or more implementations, the query transformation process 1100 is implemented or otherwise performed in connection with the automatic field priming process 500 of FIG. 5 and/or the data synchronization process 600 of FIG. 6 to allow the cross-platform service 102, 302 to request record data using a query format or domain-specific programming language supported by the desired data source 104, 118, 200, 304 in response to receiving a query from the native application 106, 306 in a general-purpose programming language that is agnostic or otherwise independent of the data source 104, 118, 200, 304. In this regard, the query transformation process 1100 allows the application extension 124, 310 and the native application 106, 306 to be configured to provide queries for the desired record data to the cross-platform service 102, 302 using a format or language that is agnostic or otherwise independent of the underlying operating system at the mobile device 110, the application platform 140 at the database system 104 and/or the particular configuration of the native application 106, 306 as dictated by the application configuration metadata 148 (e.g., C++ programming language, Java programming language, and/or the like). For example, the application extension 124, 310 and the native application 106, 306 may be configured to provide queries formatted in the C++ programming language, which may be built using a form-based visual editor supported or otherwise provided to an administrator user configuring the application configuration metadata 148 and/or the application extension 124, 310 via the virtual application 142.

The cross-platform service 102, 302 utilizes the current configuration of the native application 106, 306, including both the data source configuration metadata 126 maintained in the cache 118 and whether the native application 106, 306 is currently in an offline or online mode, to determine which of the available potential data sources 104, 118, 200, 304 to retrieve the record data from. The cross-platform service 102, 302 identifies the query language or format supported by the identified data source 104, 118, 200, 304, and then translates or otherwise converts the agnostic input query into a transformed query that is in the destination query language or format supported by the identified data source 104, 118, 200, 304. For example, in a non-LDS and online configuration of the native application 106, 306, the cross-platform service 102, 302 may convert the agnostic input query from the C++ programming language into a corresponding query statement in the SOQL format supported by the database system 104 before requesting the record data from the database system 104 using the transformed SOQL query. On the other hand, for a non-LDS and offline configuration, the cross-platform service 102, 302 translates the agnostic input query from the C++ programming language into a corresponding query statement in the SQL format supported by the local cache 118 before requesting the record data from the local cache 118 using the transformed SQL query. For an LDS configuration, the cross-platform service 102, 302 converts the agnostic input query from the C++ programming language into a corresponding query statement in the GraphQL format supported by the data service 200, which, in turn, may subsequently transform the query statement by or at the data service 200 depending on whether the record data is to be retrieved from the data service cache 204 (e.g., when offline in the LDS mode) or from the database system 104 (e.g., when online in the LDS mode). Thus, the application extension 124, 310 and the native application 106, 306 may provide input queries to the cross-platform service 102, 302 in the same agnostic format independent of what the current configuration of the native application 106, 306 is, independent of whether the mobile device 110 is connected to the network 130, and independent of what the ultimate data source 104, 118, 200, 304 responsible for serving the input query is determined to be.

Referring to FIG. 11, with continued reference to FIGS. 1-10, the query transformation process 1100 begins by receiving or otherwise obtaining an input query for record data from the native application in an agnostic format and identifying or otherwise determining which data source to request the record data from based on the current configuration of the native application (tasks 1102, 1104). For example, the application extension 124, 310 may generate or otherwise provide an input query for record data in an agnostic format to the native application 106, 306, which, in turn, instantiates one or more corresponding loaders 322 at the cross-platform service 102, 302 to retrieve the requested record data using the input query. At the cross-platform service 102, 302, the respective loader 322 references, retrieves or otherwise analyzes the application configuration metadata 126 to determine whether or not the native application 106, 306 is configured for the LDS or the non-LDS mode. Additionally, the loader 322 determines whether the current configuration of the native application 106, 306 is for an offline or online mode, which may be manually configured by a user manipulating a setting within the native application 106, 306 or automatically detected by the native application 106, 306 based on the unavailability of a connection to the network 130. Based on the current application configuration, the loader 322 determines whether to retrieve the requested record data from the local cache 118 (e.g., in a non-LDS offline mode), the database system 104 over the network 130 (e.g., in a non-LDS online mode), or the data service 200 (e.g., in an LDS mode).

After identifying the appropriate data source for servicing the request for record data, the query transformation process 1100 continues by translating, transforming or otherwise converting the input query into a different format supported by the identified data source, resulting in a transformed query suitable for retrieving data from the identified data source (task 1106). In this regard, the loader 322 responsible for retrieving the record data utilizes the identified data source to identify the corresponding destination query language or query format supported by that identified data source, identifies the originating language or format associated with the input query, and then performs various logic or processes to translate or convert the input query from the original language or format into the corresponding destination query language for the identified data source. For example, FIG. 12 depicts an input query 1200 that may be generated or otherwise provided by the application extension 124, 310 in an agnostic format (e.g., C++ programming language) to the native application 106, 306, which, in turn, provides the input query 1200 to the cross-platform service 102, 302 on behalf of the application extension 124, 310 to retrieve record data for generating the GUI display component 162, 332 associated with the application extension 124, 310 via the cross-platform service 102, 302. FIG. 13 depicts a corresponding transformed query 1300 representation of the input query 1200 in the SOQL format that may be generated by the corresponding loader 322 at the cross-platform service 102, 302 when the native application 106, 306 is configured for a non-LDS mode in an online configuration or state, and FIG. 14 depicts a corresponding transformed query 1400 representation of the input query 1200 in the SQL format that may be generated by the corresponding loader 322 at the cross-platform service 102, 302 when the native application 106, 306 is configured for a non-LDS mode in an offline configuration or state. Similarly, FIG. 15 depicts a corresponding transformed query 1500 representation of the input query 1200 in the GraphQL format that may be generated by the corresponding loader 322 at the cross-platform service 102, 302 when the native application 106, 306 is configured for an LDS mode.

In one implementation, the cross-platform service 102, 302 and/or the loaders 322 are configured to support or otherwise provide a record query builder API that is configurable to receive an input query written in the C++ programming language, parse or otherwise analyze the content of the input query using suitable string processing techniques, and convert the input query into a corresponding record query object that is created or otherwise instantiated in response to the input query. In this regard, the properties associated with the instance of the record query object stores the parameters of the input query in a strongly typed, abstract representation that can be subsequently converted into the desired destination query language or format by calling the appropriate method associated with the record query object class. Each method is configurable to utilize the defined properties of an instance of the record query object to generate a corresponding output query statement in the desired destination language or format by using the metadata that defines the format or query structure for the particular API or method at the particular data source that will handle the query. For example, to create a SOQL query statement to provide to the database system 104, the cross-platform service 102, 302 may invoke or call a getAsSoql method associated with the record query object that utilizes the metadata associated with a REST API 144 (e.g., columns, where conditions, scope, order by, etc.) that supports queries at the database system 104 to construct or otherwise generate a SOQL query statement that represents a transformed version of the input query using the properties of the record query object that were defined by the input query via the record query builder API. In a similar manner, the cross-platform service 102, 302 may invoke or call a getAsGraphQl method associated with the record query object that utilizes the metadata associated with a query API of the data service 200 that supports queries at the database system 104 to construct or otherwise generate a GraphQL query statement that represents a transformed version of the input query using the properties of the record query object that were defined by the input query.

Referring again to FIG. 11, the query transformation process 1100 continues by transmitting or otherwise providing the transformed query to the identified data source, which processes or otherwise executes the transformed query to retrieve the responsive record data (task 1108). For example, in the non-LDS online configuration of the native application 106, 306, the cross-platform service 102, 302 may transmit or otherwise provide the transformed SOQL query 1300 to an API 144 at the database system 104 over the network 130, where the API 144 executes the SOQL query 1300 to receive responsive record data from the data records 146 in the database 134 and provides the responsive record data back to the cross-platform service 102, 302 over the network 130. In the non-LDS offline configuration of the native application 106, 306, the cross-platform service 102, 302 may transmit or otherwise provide the transformed SQL query 1400 to the local cache 118 to retrieve the responsive subset of record data 128 from the cache 118. In an LDS configuration, the cross-platform service 102, 302 transmits or otherwise provides the transformed GraphQL query 1500 to the data service 200, which independently determines whether to retrieve the responsive data from the data service cache 204 or the database system 104 and provides the responsive record data back to the cross-platform service 102, 302.

After retrieving the responsive record data from the identified data source using the transformed query, the query transformation process 1100 transmits or otherwise provides the retrieved record data back to the native application as the response to the original input query received from the native application (task 1110). As described above, once the callback listener associated with the loader 322 that generated the transformed query receives the responsive record data, the loader 322 returns the responsive record data to the native application 106, 306 (either directly or via a parent loader 322), which, in turn, provides the responsive record data back to the application extension 124, 310 or the GUI display component 160, 162, 330, 332 associated with generating the original input query. Additionally, when the identified data source is realized as the database system 104, the loader 322 may store the responsive record data to the transformed input query as record data 128 in the local cache 118 for future reference (e.g., when the application configuration changes from online to offline).

Figure 16:
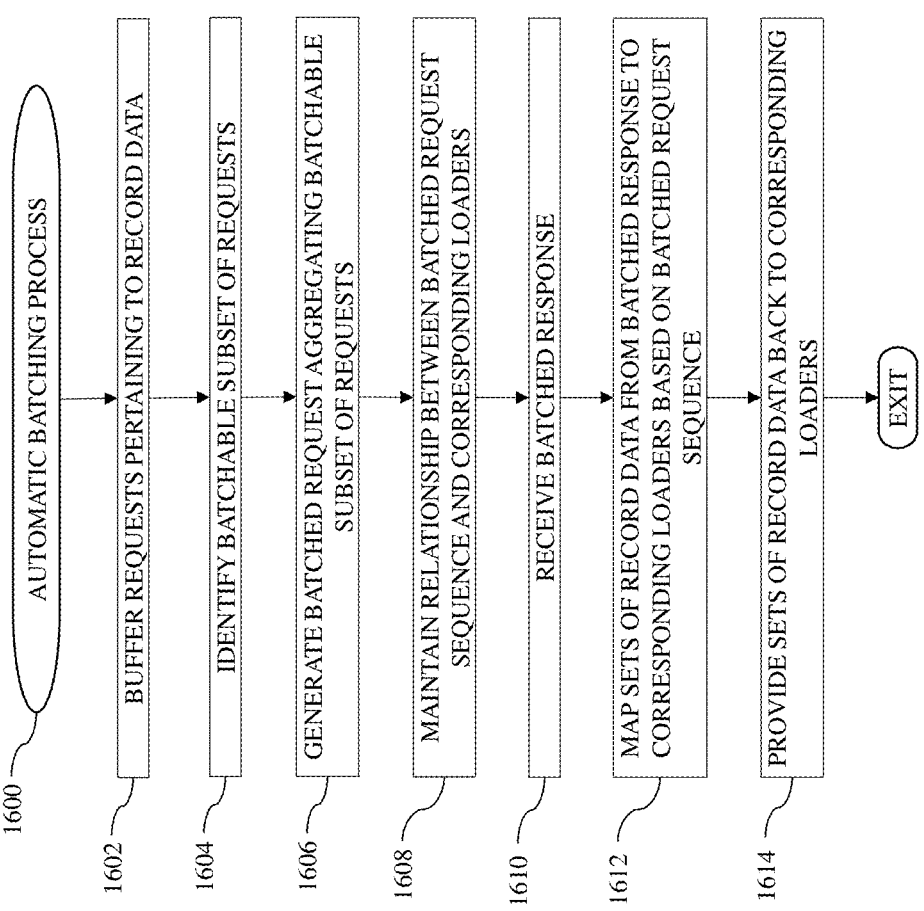
FIG. 16 is a flow diagram illustrating an automatic batching process suitable for implementation in connection with a computing system of FIGS. 1-3 according to some example implementations.

FIG. 16 depicts an exemplary automatic batching process 1600 suitable for implementation by a cross-platform service (e.g., cross-platform service 102, 302) at a mobile device (e.g., mobile device 110) to aggregate, combine or otherwise batch individual requests for record data into a batched request for transmission to a database system (e.g., database system 104) over a network and perform additional tasks, functions, and/or operations described herein. For illustrative purposes, the following description may refer to elements mentioned above in connection with FIGS. 1-3. It should be appreciated that the automatic batching process 1600 may include any number of additional or alternative tasks, the tasks need not be performed in the illustrated order and/or the tasks may be performed concurrently, and/or the automatic batching process 1600 may be incorporated into a more comprehensive procedure or process having additional functionality not described in detail herein. Moreover, one or more of the tasks shown and described in the context of FIG. 16 could be omitted from a practical implementation of the automatic batching process 1600 as long as the intended overall functionality remains intact.

In one or more implementations, the automatic batching process 1600 is implemented or otherwise performed in connection with one or more of the automatic field priming process 500 of FIG. 5, the data synchronization process 600 of FIG. 6 and/or the query transformation process 1100 of FIG. 11 to allow the cross-platform service 102, 302 to provide a batched request for record data to a database system 104 or the data service 200, rather than using individual or serial unbatched requests. In this regard, the automatic batching process 1600 allows the application extension 124, 310 and/or the native application 106, 306 to take advantage of parallelization or other optimization supported by the database system 104 or the data service 200 without requiring any special configuration or modification to the code or behavior associated with the application extension 124, 310 and/or the native application 106, 306 by abstracting the batching to the cross-platform service 102, 302 (e.g., batching proxy 324).

For example, the application extension 124, 310 may be configured to provide an input query that requests record data in an agnostic format, with the cross-platform service 102, 302 leveraging the automatic field priming process 500 and the query transformation process 1100 to transform that agnostic input query into one or more transformed queries for a more limited subset of data fields associated with data records 146 of interest that are responsive to the input query. The batching proxy 324 at the cross-platform service 102, 302 then receives and analyzes those constituent transformed queries to batch the transformed queries into a batched request that can then be transmitted or otherwise provided, over the network 130, to a corresponding API 144 associated with the application platform 140 (e.g., a bulk API), thereby allowing the application platform 140 at the database system 104 to more quickly and efficiently retrieve the responsive data for the primed data fields of the data records 146 in parallel and provide a corresponding batched response back to the batching proxy 324 at the cross-platform service 102, 302. By more quickly and efficiently servicing the requests for record data, the automatic batching process 1600 allows for the responsive record data to be returned to the application extension 124, 310 more quickly, thereby allowing the application extension GUI display components 162, 332 to be rendered, generated or otherwise populated more quickly to improve user experience. In this regard, the automatic batching process 1600 may provide improved performance to the native application 106, 306 and/or the application extension 124, 310 across different users or resource owners in a manner that is invariant with respect to the operating system of the mobile device 110 or the particular configuration of the native application 106, 306 and/or the application extension 124, 310.

Referring to FIG. 16, the automatic batching process 1600 temporarily holds or otherwise buffers queries pertaining to record data to identify a batchable subset of the queries to be aggregated into a batched request (tasks 1602, 1604, 1606). In exemplary implementations, the transformed queries generated by the loaders 322 are transmitted or otherwise provided to the batching proxy 324 which temporarily buffers or holds queries for at least a threshold duration of time to verify or otherwise confirm that there are no other contemporaneous queries capable of being combined into a batched request. In this regard, the batching proxy 324 may analyze the destination data source for a received query, the language or format of a received query, the content of a received query and potentially other batching criteria to determine whether queries within the threshold duration of time of one another are batchable. For example, in one implementation the batching proxy 324 verifies that the queries are capable of being executed in the context of the same user, that the queries are independent (e.g., they do not require information passed between queries), and that the queries are capable of being executed serially. In one implementation, the batching proxy 324 may determine two queries are batchable when they have a certain degree of commonality (or at least a threshold number of commonalities) with respect to one another based on analysis of the content of the different queries, such as, for example, the same destination data source, the same format or query language in common, and have one or more query parameters in common (e.g., a common database object type, a common CRUD operation, and/or the like). In this regard, it should be appreciated that the subject matter described herein is not limited to any particular type, number or combination of query parameters or batching criteria that may be utilized to determine whether or not queries are batchable.

After identifying a batchable subset of queries that were contemporaneously received by the batching proxy 324 within a threshold duration of time, the batching proxy 324 automatically constructs or otherwise generates a batched request that aggregates the batchable subset of queries into a single request to be provided to the database system 104 or the data service 200. In this regard, in a non-LDS application configuration, the batching proxy 324 aggregates the individual queries into a batched query input format associated with a bulk API 144 at the database system 104. In a similar manner, in an LDS configuration, the batching proxy 324 aggregates the individual queries into a batched query input format associated with a batch API associated with the data service 200. For example, the data service 200 may include or otherwise support a composite request that is capable of executing a series of REST APIs in a single CRUD request, such as a single POST request including a series of REST API requests to store data at the database system 104 or a single GET request to retrieve a list of data from the database 134. In this regard, the batching proxy 324 aggregates any individual GraphQL queries to be batched that include POST requests into a first composite request to be provided to an API associated with the data service 200, aggregates any individual GraphQL queries for GET requests into a second composite request to be provided to an API associated with the data service 200, and so on. When one or more individual queries are not batchable with any other contemporaneous queries within a threshold period of time, the batching proxy 324 transmits or otherwise provides the individual queries to the appropriate data source 104, 200 for individual execution, rather than delaying execution of individual queries until they are able to be batched.

For example, the batching proxy 324 may automatically determine that a first query (e.g., {"method": "PATCH", "url": "v55.0/sobjects/account/001D000000K0fXOIAZ", "richInput": {"Name": "NewName"}}) and a second query (e.g., {"method": "GET", "url": "v55.0/sobjects/account/001D000000K0fXOIAZ?fields=Name,BillingPostalCode"}) are batchable based on the two queries having the same format or query language and both referring to the same data record 146 or location at the database system 104 (e.g., "v55.0/sobjects/account/001D000000K0fXOIAZ"), with both queries being received by the batching proxy 324 within a threshold duration of time (e.g., within 0.25 milliseconds of one another). In response, the batching proxy 324 automatically constructs a batched request by aggregating the individual queries into a batched query request in the format supported by the API 144 at the database system 104 (e.g., {"batchRequests": [{"method": "PATCH", "url": "v55.0/sobjects/account/001D000000K0fXOIAZ", "richInput" {"Name": "NewName"}}, {"method" "GET", "url": "v55.0/sobjects/account/001D000000K0fXOIAZ?fields=Name, BillingPostalCode"}]}). The batching proxy 324 then transmits or otherwise provides the batched query request to the bulk API 144 at the database system 104 which processes or otherwise executes the batched query request to perform the individual queries contained therein in an efficient manner (e.g., using parallelization, concurrency or other processing optimizations).

The automatic batching process 1600 stores or otherwise maintains the relationship or association between the respective sequence of each individual query aggregated into a batched request and the corresponding loader or other originator of that respective query (task 1608). In this regard, for a given batched query request, the batching proxy 324 maintain a listing of the different loaders 322 or callback listeners associated therewith for each of the queries contained in the batched query request in the same sequence or order in which the individual constituent queries were ordered in the batched query request. The automatic batching process 1600 receives or otherwise obtains a batched response that includes the responsive record data and maps the different sets of record data contained in the batched response back to the corresponding loaders using the stored batched request sequence (tasks 1610, 1612). In this regard, the database system 104 or the data service 200 may respond to the batched query request with a batched response that includes ordered sets of record data, where each set of record data is ordered within the batched response in a manner that corresponds to the ordering of the respective query that the respective set of record data is responsive to within the batched query request. For example, the first set of record data in the batched response is responsive to the first query in the batched query request, the second set of record data in the batched response is responsive to the second query in the batched query request, and so on. After mapping a set of record data from the batched response to the corresponding loader where the query for that responsive set of record data originated, the automatic batching process 1600 transmits or otherwise provides the set of record data back to the corresponding loader for which the set of record data is responsive to (task 1614). In this regard, the batching proxy 324 maintains correspondence between ordering of the different queries originating from the different loaders 322 that were aggregated into the batched query request and the ordering of the responsive sets of record data that were aggregated into the batched response received from the database system 104 or the data service 200.

By virtue of the automatic batching process 1600, the cross-platform service 102, 302 leverages the batch APIs supported by the database system 104 or the data service 200 to more efficiently utilize the available bandwidth on the network 130 and more quickly receive the responsive record data for priming the data fields of record data to be utilized for generating or otherwise populating the GUI displays 108, 308 associated with the native application 106, 306 and the GUI display components 160, 162, 330, 332 contained therein. For example, when an application extension 124, 310 includes a GUI display component 162, 332 that utilizes or otherwise includes multiple different data fields of the same data record 146 or multiple data records 146 of the same database object type, the cross-platform service 102, 302 may automatically batch the corresponding queries to the database system 104 to more quickly and efficiently received the record data necessary for generating or populating the GUI display component 162, 332, thereby improving the user experience without increasing the complexity for an administrator user designing or configuring the application extension 124, 310. Moreover, the loading time or performance and corresponding user experience associated with the GUI display component 162, 332 of the application extension 124, 310 may be maintained substantially the same independent of the operating system associated with the mobile device 110 or the underlying native application 106, 306, and independent of whether the native application 106, 306 is configured for the LDS mode or the non-LDS mode, by virtue of the batching behavior of the cross-platform service 102, 302 being standard across any potential configuration or implementation of the native application 106, 306.

Figure 17:
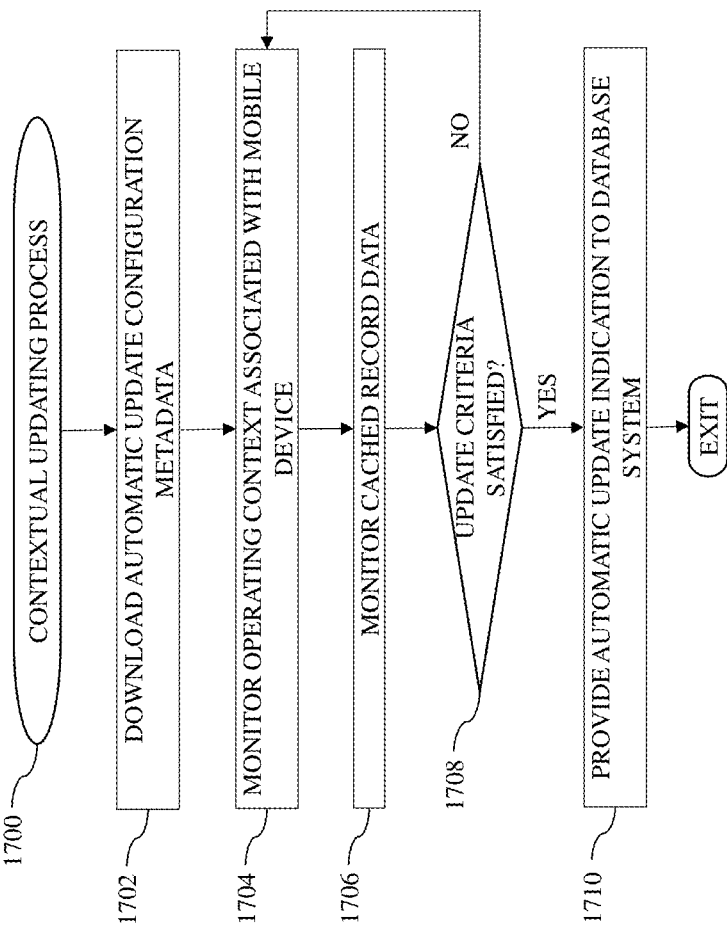
FIG. 17 is a flow diagram illustrating a contextual updating process suitable for implementation in connection with a computing system of FIGS. 1-3 according to some example implementations.

FIG. 17 depicts an exemplary contextual updating process 1700 suitable for implementation by a cross-platform service (e.g., cross-platform service 102, 302) at a mobile device (e.g., mobile device 110) to trigger or otherwise initiate server-side actions at a database system (e.g., database system 104) based on the current operating context associated with the mobile device and perform additional tasks, functions, and/or operations described herein. For illustrative purposes, the following description may refer to elements mentioned above in connection with FIGS. 1-3. It should be appreciated that the contextual updating process 1700 may include any number of additional or alternative tasks, the tasks need not be performed in the illustrated order and/or the tasks may be performed concurrently, and/or the contextual updating process 1700 may be incorporated into a more comprehensive procedure or process having additional functionality not described in detail herein. Moreover, one or more of the tasks shown and described in the context of FIG. 17 could be omitted from a practical implementation of the contextual updating process 1700 as long as the intended overall functionality remains intact.

Referring to FIG. 17 with reference to FIGS. 1-3, the contextual updating process 1700 allows an administrator user associated with a resource owner to configure various server-side actions to be performed by an application server 132 and/or the application platform 140 at the database system 104 to be initiated or otherwise triggered automatically in the background by client-side changes to the operating context associated with the mobile device 110. For purposes of explanation, the subject matter is described herein in the context of the operating context triggering the server-side actions being realized as the geographic location of the mobile device 110; however, it should be appreciated that the subject matter described herein is not limited to geographic location and may be implemented in an equivalent manner with respect to any other parameter or variable (or combination thereof) capable of characterizing the operating context or environment in which the mobile device 110 is being operated in, such as, for example, an internet protocol (IP) address or another network address indicative of a location of the mobile device 110 on the network 130, detection of a nearby device (e.g., using Bluetooth, near-field communication (NFC) or another sensing or detection technique), and/or the like.

To support the contextual updating process 1700, the cross-platform service 102, 302 downloads or otherwise retrieves, from the database system 104 as part of the initialization process for the native application 106, 306, the application configuration metadata 126, 148 that includes update criteria 318 specific to the resource owner's configuration of the native application 106, 306. In this regard, the update criteria 318 may specify particular values, thresholds or logic for determining whether a particular action should be initiated or triggered based on the current state of the mobile device 110 and/or the current state of the record data 128 at the mobile device 110 when the update criteria 318 are satisfied. For example, as one example, the update criteria 318 may specify an update to the status field of a service appointment data record 146 at the database system 104 should be initiated when a current location of the mobile device 110 is equal to or within a threshold distance of the cached address field value for the service appointment data record 146 that is currently maintained at the mobile device 110 (e.g., in cache 118, 204) at or within a threshold time of the cached scheduled start field value for that same service appointment data record 146 that is currently maintained at the mobile device 110. In this regard, the cross-platform service 102, 302 (e.g., the location monitoring component 328) monitors the location of the mobile device 110 (e.g., using a location service 314 associated with the operating system of the mobile device 110) in relation to the cached address field values at the mobile device 110 to detect or otherwise identify when the current location of the mobile device 110 indicates that the field technician user of the mobile device 110 is at the address associated with a particular service appointment. When the current location of the mobile device 110 matches or otherwise corresponds to a cached address field value for a service appointment (e.g., by being within a threshold distance of the address) and otherwise satisfies the update criteria 318, the cross-platform service 102, 302 may automatically transmit or otherwise provide an indication to the application platform 140 at the database system 104 that indicates the update criteria 318 are satisfied with respect to a particular service appointment data record 146 (e.g., by providing the corresponding appointment number field value or other identifying information for the service appointment).

In response to the indication of the update criteria 318 being satisfied by the current operating context of the mobile device 110, the application platform 140 at the database system 104 may automatically initiate or otherwise perform one or more actions at the database system 104 that are associated with the particular set of update criteria 318 with respect to the identified data record 146. For example, an administrator user may utilize the virtual application 142 to define or otherwise identify different processes, workflows, reports or other actions to be performed by the application platform 140 in connection with defining the update criteria 318 to be maintained as the application configuration metadata 148, such that the application platform 140 automatically initiates one or more processes or workflows, automatically generates one or more reports, and/or the like associated with a given set of update criteria 318 by referencing the application configuration metadata 148 associated with the resource owner in response to receiving indication of that set of update criteria 318 being satisfied. In this regard, both the update criteria 318 and associated server-side actions may be configured and otherwise controlled from the server-side by the application configuration metadata 148 at the database system 104, with the cross-platform service 102, 302 merely providing indication of when particular update criteria 318 are satisfied at the client-side.

Referring to FIG. 17, the illustrated contextual updating process 1700 begins by downloading or otherwise obtaining automatic update configuration metadata to the mobile device and thereafter monitoring the operating context associated with the mobile device and the cached record data at the mobile device in relation to the update criteria to detect or otherwise identify when update criteria associated with an automatic update are satisfied (tasks 1702, 1704, 1706, 1708). In this regard, when the native application 106, 306 launches or is otherwise initialized at the mobile device 110, the cross-platform service 102, 302 downloads or otherwise retrieves the application configuration metadata 148 from the database system 104 that includes automatic update criteria 318 to be stored as application configuration metadata 126 in the local cache 118 for reference by a monitoring component 328 of the cross-platform service 102, 302. For example, when the automatic update criteria 318 involve or otherwise include the geographic location of the mobile device 110, a location monitoring component 328 of the cross-platform service 102, 302 may be configured to subscribe to or otherwise interface with a location service 314 at the mobile device 110 to receive indicia of the current geographic location of the mobile device 110 substantially in real-time. Thereafter, the location monitoring component 328 compares the current geographic location of the mobile device 110 to the automatic update criteria 318 to detect when the current geographic location of the mobile device 110 satisfies the automatic update criteria 318. In this regard, when the automatic update criteria 318 includes as one of the update criterion that the current geographic location match or otherwise correspond to one of the field technician user's service appointments, the location monitoring component 328 may monitor the current mobile geographic location in relation to the cached address field values for the cached service appointment record data 128 to detect when the current mobile device geographic location is equal to or within a threshold distance of one of the cached address field values, thereby satisfying the update criterion. It should be appreciated that the subject matter is not limited to any particular type, number or configuration of update criteria. For example, in addition to considering the mobile device geographic location, the automatic update criteria 318 may consider the current time in relation to cached field values for different times associated with a service appointment, and/or the like.

When one or more automatic update criteria are satisfied based on the current operating context of the mobile device, the contextual updating process 1700 automatically transmits or otherwise provides indication of the automatic update criteria being satisfied to an application server or application platform at a database system (task 1710). For example, when the current mobile device geographic location matches the cached address field value for a service appointment data record 146, the cross-platform service 102, 302 and/or the location monitoring component 328 may automatically transmit or otherwise provide indication to the application platform 140 at the database system 104 that the particular update criteria 318 were satisfied with respect to that particular service appointment data record 146. In response, the application platform 140 at the database system 104 may utilize the application configuration metadata 148 to identify the automated server-side action(s) associated with that particular update criteria 318 and then automatically initiate execution of the identified automated server-side action(s) with respect to the identified service appointment data record 146 in the database 134. For example, in one implementation, when the current mobile device geographic location matches the cached address field value for a service appointment data record 146, the application platform 140 may automatically update the field value for the status field of that identified service appointment data record 146 from "Scheduled" to "In Progress" in response to receiving indication from the cross-platform service 102, 302. In some implementations, the cross-platform service 102, 302 may download or otherwise maintain the server-side actions to be initiated at the mobile device 110 (e.g., as part of the cached application configuration metadata 126), such that when the update criteria 318 are satisfied, the cross-platform service 102, 302 transmits or otherwise provides a request or other instruction to perform the configured server-side action to the application platform 140 over the network 130, for example, by providing a request to update the status field value for the particular service appointment data record 146.

Referring to FIG. 17 with continued reference to FIGS. 1-3 and 6-10, in one or more implementations, the automatically-initiated server-side actions may result in corresponding updates to the GUI displays 108, 308 or the GUI display components 160, 162, 330, 332 provided by the native application 106, 306 and/or the application extension 124, 310 at the mobile device 110 when the server-side actions result in changes to data field values in a data record 146 at the database system 104 for which the data change manager 326 and/or the data synchronization process 600 has been configured. For example, when the data change manager 326 is subscribed to data change events with respect to the status field of a service appointment data record 146 at the database system 104 (e.g., by subscribing to a streaming API 144 at the application platform 140), in response to application platform 140 automatically updating the status field value of service appointment data record 146 to "In Progress," the data change listener associated with a particular loader 322 subscribed to the status field value may be apprised of the data change at the database system 104 (e.g., via the streaming API), thereby automatically updating the record data 128 to reflect the server-side data changes and allowing the native application 106, 306 and/or the application extension 124, 310 to automatically respond to the data change (e.g., by automatically updating a GUI display component 160, 162, 330, 332 to reflect the new status field value).

Figure 18:
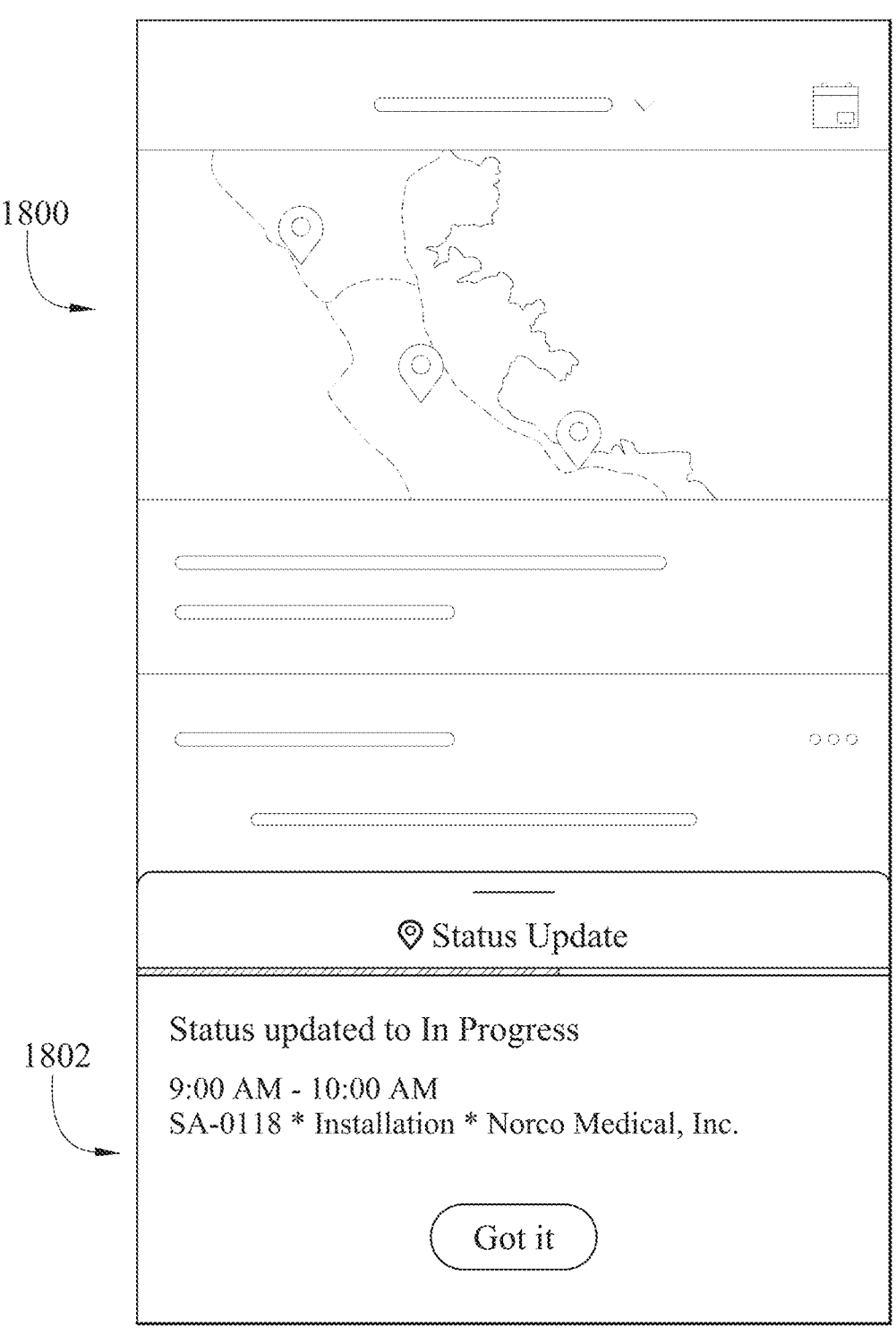
FIG. 18 depicts an example GUI display suitable for presentation on a mobile device in connection with the contextual updating process of FIG. 17 according to an example implementation.

FIG. 18 depicts an exemplary GUI display 1800 that may be generated or otherwise presented by the native application 106, 306 on the display device 112 of the mobile device 110 in connection with an exemplary implementation of the contextual updating process 1700 of FIG. 17. For example, continuing the above example, when the current geographic location of the mobile device 110 matches or otherwise corresponds to the cached address field value associated with the service appointment data record 146 having the SA-0118 appointment number field value, the cross-platform service 102, 302 may provide a corresponding indication to the application platform 140 that the geographic location automatic update criteria 318 associated with the SA-0118 service appointment data record 146 is satisfied. In response, the application platform 140 at the application server 132 may automatically update the status field value for the SA-0118 service appointment data record 146 to "In Progress." In response to the change to the status field value in the data record 146 at the database system 104, a data change listener associated with a loader 322 subscribed to the status field may be notified of the updated status field value, and in response, the native application 106, 306 and/or the application extension 124, 310 associated with that loader 322 may dynamically generate a pop-up window or similar GUI display component 1802 on or overlying the service appointment GUI display 1800 that includes a user notification or other indication of the updated status field value resulting from the server-side action(s) that were automatically triggered based on the geographic location of the mobile device 110.

By virtue of the contextual updating process 1700 in concert with the data synchronization process 600, automatic updates to the client-side GUI displays 108, 308 or the GUI display components 160, 162, 330, 332 contained therein may be controlled or otherwise dictated by the server-side application platform 140 at the database system 104 based on the configuration of the application configuration metadata 148 and the update criteria 318 associated therewith. For example, in some implementations where the LDS mode is configured and the client-side GUI displays 108, 308 include GUI display components 160, 162, 330, 332 that are realized as web components (e.g., Lightning Web Components (LWCs)), both the content and behavior of such web components 160, 162, 330, 332 may be dictated by their corresponding configurations at the server and synchronized with the data records 146 at the database system 104 using the data service 200, thereby providing an administrator user server-side control of the user experience via the virtual application 142 and the application configuration metadata 148. It should be noted that the contextual updating process 1700 is not limited to updating client-side GUI displays, and any number of different actions could be triggered or initiated, at the mobile device 110, by the server-side application platform 140 at the database system 104 based on the configuration of the application configuration metadata 148 in response to receiving a contextual-triggered notification from the cross-platform service 102, 302 at the mobile device 110.

Figure 20:
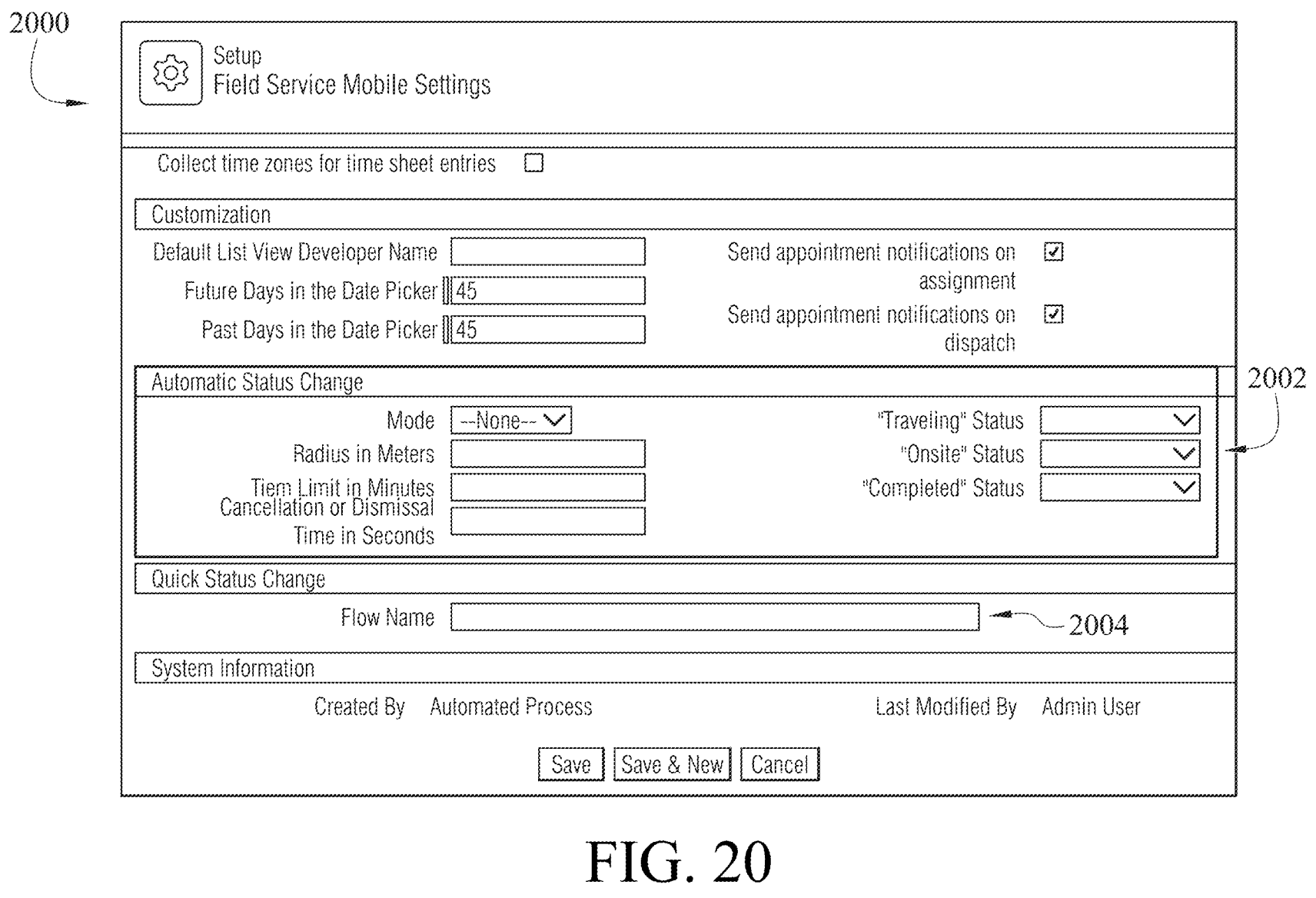

FIG. 20 depicts an exemplary update configuration GUI display 2000 suitable for presentation by a virtual application 142 to allow an administrator user associated with a resource owner to configure update criteria 318 specific to the resource owner's configuration of the native application 106, 306. The update configuration GUI display 2000 includes an update criteria region 2002 that includes GUI elements manipulable by the user to define the desired update criteria to be applied, such as, for example, the desired update mode (e.g., manual, timed, or automatic), the threshold radius for the difference in distance between the location of the mobile device 110 and the geographic location associated with a service appointment data record 146 that triggers an automatic update (e.g., 100 meters), the temporal criteria to be associated with an automatic update (e.g., a window or threshold amount of time before or after a time associated with a service appointment data record 146 during which an automatic update can be triggered), and a cancellation or dismissal timer for the delay between when an update is triggered and when the update is implemented at the database system 104 for the timed mode. In this regard, in the timed mode, the user of the mobile device 110 must cancel or confirm the change within the window defined by the cancellation or dismissal timer, otherwise the update will be automatically triggered once the defined time period for the cancellation or dismissal timer elapses. In the manual mode, the user of the mobile device 110 must manually cancel or confirm the change, while in the automatic mode, the cross-platform service 102, 302 automatically triggers the automatic update and the user of the mobile device 110 is notified after the change at the database system 104 occurs as depicted in FIG. 18. The update criteria region 2002 also includes GUI elements that allow the user to define different status field values to be implemented at the database system 104, such as, for example, the desired status field value that indicates that a mobile worker is traveling to a service appointment, the desired status field value that indicates that a mobile worker is at a service appointment and desired status field value that indicates that a mobile worker completed a service appointment. The update configuration GUI display 2000 includes an action configuration region 2004 that includes GUI elements that allow the administrator user to define process flows or other server-side actions to be automatically initiated at the database system 104 when the update criteria are satisfied (e.g., automatically generate service report based on an automated change to service appointment status, automatically order parts based on fields of the service appointment object, automatically schedule or cancel additional service appointments based on fields of the service appointment object).

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read-only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 19A:
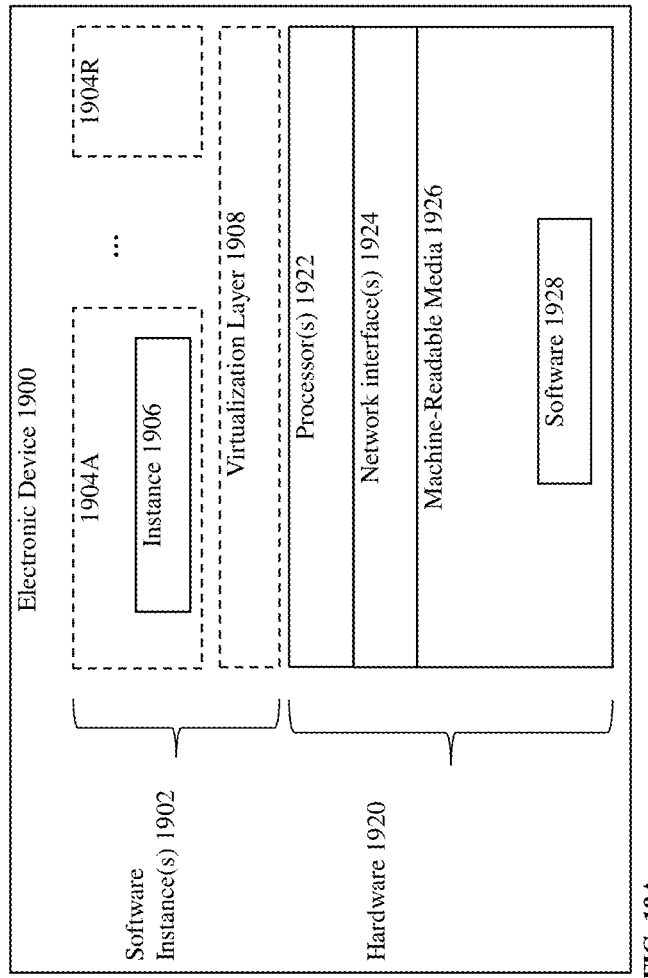
FIG. 19A is a block diagram illustrating an electronic device according to some example implementations.

FIG. 19A is a block diagram illustrating an electronic device 1900 according to some example implementations. FIG. 19A includes hardware 1920 comprising a set of one or more processor(s) 1922, a set of one or more network interfaces 1924 (wireless and/or wired), and machine-readable media 1926 having stored therein software 1928 (which includes instructions executable by the set of one or more processor(s) 1922). The machine-readable media 1926 may include non-transitory and/or transitory machine-readable media. Each of the previously described clients and a cross-platform service may be implemented in one or more electronic devices 1900. In one implementation: 1) each of the clients is implemented in a separate one of the electronic devices 1900 (e.g., in end user devices where the software 1928 represents the software to implement clients to interface directly and/or indirectly with the cross-platform service (e.g., software 1928 represents a web browser, a native client, a portal, a command-line interface, and/or an application programming interface (API) based upon protocols such as Simple Object Access Protocol (SOAP), Representational State Transfer (REST), etc.)); 2) the cross-platform service is implemented in a separate set of one or more of the electronic devices 1900 (e.g., a set of one or more server devices where the software 1928 represents the software to implement the cross-platform service); and 3) in operation, the electronic devices implementing the clients and the cross-platform service would be communicatively coupled (e.g., by a network) and would establish between them (or through one or more other layers and/or or other services) connections for submitting requests to the cross-platform service. Other configurations of electronic devices may be used in other implementations (e.g., an implementation in which the client and the cross-platform service are implemented on a single one of electronic device 1900).

During operation, an instance of the software 1928 (illustrated as instance 1906 and referred to as a software instance; and in the more specific case of an application, as an application instance) is executed. In electronic devices that use compute virtualization, the set of one or more processor(s) 1922 typically execute software to instantiate a virtualization layer 1908 and one or more software container (s) 1904A-1904R (e.g., with operating system-level virtualization, the virtualization layer 1908 may represent a container engine (such as Docker Engine by Docker, Inc. or rkt in Container Linux by Red Hat, Inc.) running on top of (or integrated into) an operating system, and it allows for the creation of multiple software containers 1904A-1904R (representing separate user space instances and also called virtualization engines, virtual private servers, or jails) that may each be used to execute a set of one or more applications; with full virtualization, the virtualization layer 1908 represents a hypervisor (sometimes referred to as a virtual machine monitor (VMM)) or a hypervisor executing on top of a host operating system, and the software containers 1904A-1904R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 1928 is executed within the software container 1904A on the virtualization layer 1908. In electronic devices where compute virtualization is not used, the instance 1906 on top of a host operating system is executed on the "bare metal" electronic device 1900. The instantiation of the instance 1906, as well as the virtualization layer 1908 and software containers 1904A-1904R if implemented, are collectively referred to as software instance(s) 1902.

Alternative implementations of an electronic device may have numerous variations from that described above. For example, customized hardware and/or accelerators might also be used in an electronic device.

Figure 19B:
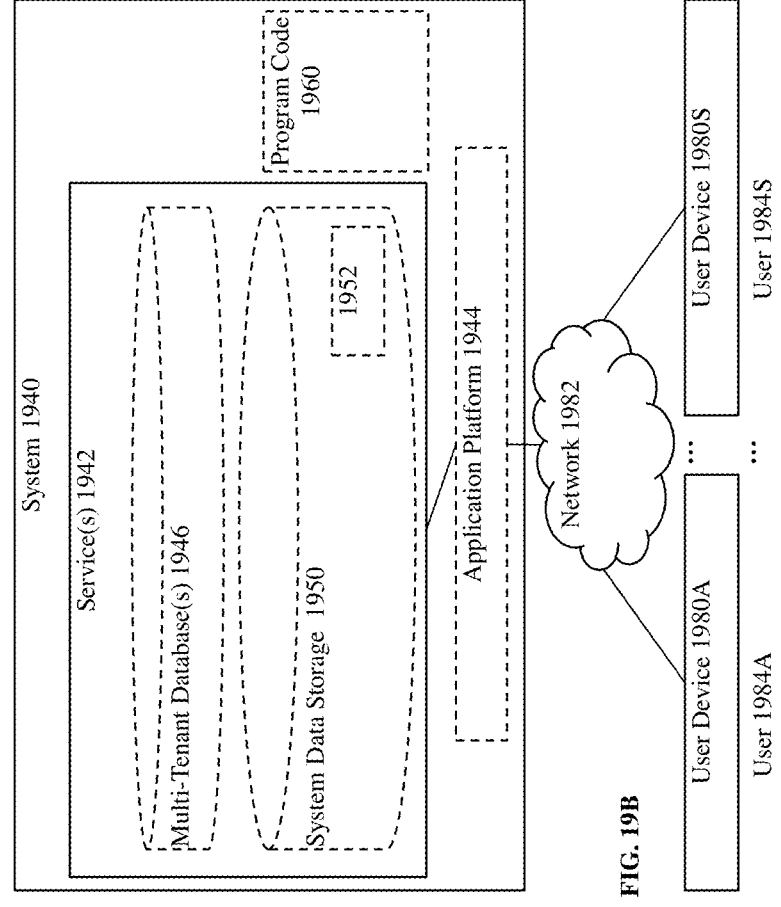
FIG. 19B is a block diagram of a deployment environment according to some example implementations.

FIG. 19B is a block diagram of a deployment environment according to some example implementations. A system 1940 includes hardware (e.g., a set of one or more server devices) and software to provide service(s) 1942, including one or more services configurable to support a cross-platform service. In some implementations the system 1940 is in one or more datacenter(s). These datacenter(s) may be: 1) first party datacenter(s), which are datacenter(s) owned and/or operated by the same entity that provides and/or operates some or all of the software that provides the service(s) 1942; and/or 2) third-party datacenter(s), which are datacenter(s) owned and/or operated by one or more different entities than the entity that provides the service(s) 1942 (e.g., the different entities may host some or all of the software provided and/or operated by the entity that provides the service(s) 1942). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 1940 is coupled to user devices 1980A-1980S over a network 1982. The service(s) 1942 may be on-demand services that are made available to one or more of the users 1984A-1984S working for one or more entities other than the entity which owns and/or operates the on-demand services (those users sometimes referred to as outside users) so that those entities need not be concerned with building and/or maintaining a system, but instead may make use of the service(s) 1942 when needed (e.g., when needed by the users 1984A-1984S). The service(s) 1942 may communicate with each other and/or with one or more of the user devices 1980A-1980S via one or more APIs (e.g., a REST API). In some implementations, the user devices 1980A-1980S are operated by users 1984A-1984S, and each may be operated as a client device and/or a server device. In some implementations, one or more of the user devices 1980A-1980S are separate ones of the electronic device 1900 or include one or more features of the electronic device 1900.

In some implementations, the system 1940 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants. In one implementation, the system 1940 is a multi-tenant cloud computing architecture supporting multiple services, such as one or more of the following types of services: Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Authorization; Authentication; Security; and Identity and access management (IAM). For example, system 1940 may include an application platform 1944 that enables PAAS for creating, managing, and executing one or more applications developed by the provider of the application platform 1944, users accessing the system 1940 via one or more of user devices 1980A-1980S, or third-party application developers accessing the system 1940 via one or more of user devices 1980A-1980S.

In some implementations, one or more of the service(s) 1942 may use one or more multi-tenant databases 1946, as well as system data storage 1950 for system data 1952 accessible to system 1940. In certain implementations, the system 1940 includes a set of one or more servers that are running on server electronic devices and that are configured to handle requests for any authorized user associated with any tenant (there is no server affinity for a user and/or tenant to a specific server). The user devices 1980A-1980S communicate with the server(s) of system 1940 to request and update tenant-level data and system-level data hosted by system 1940, and in response the system 1940 (e.g., one or more servers in system 1940) automatically may generate one or more Structured Query Language (SQL) statements (e.g., one or more SQL queries) that are designed to access the desired information from the multi-tenant database(s) 1946 and/or system data storage 1950.

In some implementations, the service(s) 1942 are implemented using virtual applications dynamically created at run time responsive to queries from the user devices 1980A-1980S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 1962 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 1944 includes an application setup mechanism that supports application developers' creation and management of applications, which may be saved as metadata by save routines. Invocations to such applications, including by the cross-platform service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 1982 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a third Generation Partnership Project (3GPP) protocol, a fourth generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 1940 and the user devices 1980A-1980S.

Each user device 1980A-1980S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 1940. For example, the user interface device can be used to access data and applications hosted by system 1940, and to perform searches on stored data, and otherwise allow one or more of users 1984A-1984S to interact with various GUI pages that may be presented to the one or more of users 1984A-1984S. User devices 1980A-1980S might communicate with system 1940 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 1980A-1980S might include an HTTP client, commonly referred to as a "browser," for sending and receiving HTTP messages to and from server(s) of system 1940, thus allowing users 1984A-1984S of the user devices 1980A-1980S to access, process and view information, pages and applications available to it from system 1940 over network 1982.

In the above description, numerous specific details such as resource partitioning/sharing/duplication implementations, types and interrelationships of system components, and logic partitioning/integration choices are set forth in order to provide a more thorough understanding. The invention may be practiced without such specific details, however.

In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting. Accordingly, details of the exemplary implementations described above should not be read into the claims absent a clear intention to the contrary.

What is claimed is:

1. A method of updating a graphical user interface (GUI) display component at a client device by initiating an action at a database system based on a current geographic location of the client device by an instance of a field service application at the client device coupled to the database system over a network, the method comprising:

monitoring, by a service associated with the field service application at the client device, a first indication of the current geographic location of the client device provided by a location service associated with an operating system of the client device to determine the current geographic location of the client device satisfies update criteria including a field of a data record at the database system associated with a service appointment when the current geographic location of the client device is within a threshold distance of a value for the field of the data record corresponding to an address for the service appointment;

when the current geographic location of the client device satisfies the update criteria, automatically providing, by the service associated with the field service application to the database system over the network, a second indication that the update criteria is satisfied to automatically update a status field of the data record associated with the service appointment at the database system in accordance with a configuration associated with the instance of the field service application; and updating the GUI display component presented by the field service application at the client device to reflect a new status field value for the status field after updating the status field of the data record at the database system.

2. The method of claim 1, wherein the database system updates the status field of the data record to the new status field value of In Progress in response to the second indication.

3. The method of claim 1, wherein automatically providing the second indication comprises the service providing a request to update a status field value for the data record associated with the service appointment to the database system over the network.

4. The method of claim 1, further comprising downloading, by the service associated with the field service application at the client device, application configuration metadata from the database system over the network, wherein the application configuration metadata includes the update criteria.

5. The method of claim 4, wherein the update criteria are specific to a resource owner's configuration of the field service application.

6. The method of claim 1, wherein the update criteria are configured by an administrator user associated with a resource owner and a user of the client device comprises a field service technician associated with the resource owner.

7. The method of claim 6, wherein the resource owner comprises a tenant of the database system.

8. The method of claim 1, wherein the field service application at the client device comprises a mobile application at a mobile device.

9. The method of claim 1, wherein updating the GUI display component comprises automatically updating a list GUI display component within a region of a GUI display presented by the field service application.

10. The method of claim 1, further comprising dynamically generating the GUI display component comprising a user notification of an updated status field value comprising the new status field value on a GUI display presented by the field service application after updating the status field.

11. The method of claim 1, further comprising providing, by the field service application at the client device, a second graphical user interface (GUI) display component that allows a user of the client device to change the status field.

12. The method of claim 1, wherein monitoring the first indication of the current geographic location of the client device to determine the current geographic location of the client device satisfies the update criteria comprises detecting when the current geographic location of a mobile device is within the threshold distance of a cached address field value for the data record corresponding to the address for the service appointment.

13. The method of claim 1, wherein:
the client device comprises a mobile device; and
monitoring the first indication of the current geographic location of the client device to determine the current geographic location of the client device satisfies the update criteria comprises detecting when an protocol (IP) address or another network address is indicative of the current geographic location of the mobile device being within the threshold distance of the value for the field of the data record corresponding to the address for the service appointment.

14. The method of claim 1, wherein the field of the data record comprises a location field.

15. The method of claim 1, wherein the field comprises an address field of a service appointment database object.

16. The method of claim 1, further comprising determining the current geographic location of the client device satisfies the update criteria by detecting when the current geographic location of the client device is within the threshold distance of a service appointment address field value for an address field of the data record.

17. The method of claim 16, further comprising downloading, by the service, record data associated with the data record at the database system to a local cache at the client device, resulting in a cached address field value in the local cache at the client device, wherein detecting when the current geographic location of the client device is within the threshold distance comprises detecting the current geographic location of the client device is within the threshold distance of the cached address field value.

18. The method of claim 1, wherein updating the GUI display component comprises dynamically generating a pop-up window comprising the GUI display component on GUI display presented by the field service application.

19. A method of initiating an action at a database system by an instance of a field service application at a mobile device coupled to the database system over a network, the method comprising:
monitoring, by a service associated with the field service application at the mobile device, a location of the mobile device to determine the location of the mobile device satisfies update criteria including a field of a data record associated with a service appointment when the location of the mobile device is within a threshold distance of a value for the field of the data record corresponding to an address for the service appointment by detecting a nearby device indicative of the location of the mobile device being within the threshold distance of the value for the field of the data record corresponding to the address for the service appointment using Bluetooth or near-field communication (NFC); and
when the location of the mobile device satisfies the update criteria, automatically providing, by the service associated with the field service application to the database system over the network, an indication that the update criteria is satisfied to automatically update a status field of the data record associated with the service appointment at the database system in accordance with a configuration associated with the instance of the field service application.

20. A non-transitory machine-readable storage medium that provides instructions that, when executed by a processor of a mobile device, are configurable to cause the processor to provide a service associated with a field service application configurable to perform operations comprising:
monitoring a first indication of a current geographic location of the mobile device provided by a location service associated with an operating system of the mobile device to determine the current geographic location of the mobile device satisfies update criteria including a field of a data record at a database system associated with a service appointment when the current geographic location of the mobile device is within a threshold distance of a value for the field of the data record corresponding to an address for the service appointment;
when the current geographic location of the mobile device satisfies the update criteria, automatically providing, to the database system over a network, a second indication that the update criteria is satisfied to automatically update a status field of the data record associated with the service appointment at the database system in accordance with a configuration associated with an instance of the field service application; and
updating a graphical user interface (GUI) display component presented by the field service application at the mobile device to reflect a new status field value for the status field after updating the status field of the data record at the database system.

* * * * *